(12) United States Patent
Higgins et al.

(10) Patent No.: US 8,055,675 B2
(45) Date of Patent: Nov. 8, 2011

(54) SYSTEM AND METHOD FOR CONTEXT BASED QUERY AUGMENTATION

(75) Inventors: Christopher William Higgins, Portland, OR (US); Marc Eliot Davis, San Francisco, CA (US); Christopher T Paretti, San Francisco, CA (US); Simon P King, Berkeley, CA (US); Rahul Nair, Sunnyvale, CA (US); Carrie Burgener, Mountainview, CA (US)

(73) Assignee: Yahoo! Inc., Sunnyvale, CA (US)

( * ) Notice: Subject to any disclaimer, the term of this patent is extended or adjusted under 35 U.S.C. 154(b) by 360 days.

(21) Appl. No.: 12/329,038

(22) Filed: Dec. 5, 2008

(65) Prior Publication Data

US 2010/0145976 A1 Jun. 10, 2010

(51) Int. Cl.
*G06F 17/30* (2006.01)
*G06F 7/00* (2006.01)

(52) U.S. Cl. ......... 707/769; 707/711; 707/725; 707/765

(58) Field of Classification Search .................. None
See application file for complete search history.

(56) References Cited

U.S. PATENT DOCUMENTS

| | | |
|---|---|---|
| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |
| 5,835,087 A | 11/1998 | Herz |
| 5,903,848 A | 5/1999 | Takahashi |

(Continued)

FOREIGN PATENT DOCUMENTS

EP 1362302 11/2003

(Continued)

OTHER PUBLICATIONS

International Search Report (PCT/US2009/060476) dated May 4, 2010; 3 pages.

(Continued)

*Primary Examiner* — Greta Robinson
*Assistant Examiner* — James J Wilcox
(74) *Attorney, Agent, or Firm* — James J. DeCarlo; Greenberg Traurig, LLP

(57) ABSTRACT

A system and method for context based query augmentation. A question is received over a network from a questioning user comprising an identification of a user and at least one question criteria. A first query is formulated so as to search, via the network, for user profile data, social network data, spatial data, temporal data and topical data so as to identify user context data relevant to question criteria. The question is modified using the user context data to create at least one modified question having at least one additional criteria based on the user context data. A second query is formulated so as to search, via the network, for knowledge data, user profile data, social network data, spatial data, temporal data and topical data so as to identify knowledge data relevant to the identified user and the modified question criteria. The knowledge data is transmitted, over the network, to the questioning user.

89 Claims, 12 Drawing Sheets

U.S. PATENT DOCUMENTS

| | | | |
|---|---|---|---|
| 5,920,854 A * | 7/1999 | Kirsch et al. | 1/1 |
| 6,014,638 A | 1/2000 | Burge et al. | |
| 6,021,403 A | 2/2000 | Horvitz et al. | |
| 6,047,234 A | 4/2000 | Cherveny et al. | |
| 6,098,065 A | 8/2000 | Skillen et al. | |
| 6,112,181 A | 8/2000 | Shear et al. | |
| 6,157,924 A | 12/2000 | Austin | |
| 6,169,992 B1 | 1/2001 | Beall et al. | |
| 6,212,552 B1 | 4/2001 | Biliris et al. | |
| 6,266,667 B1 | 7/2001 | Olsson | |
| 6,314,365 B1 | 11/2001 | Smith | |
| 6,314,399 B1 | 11/2001 | Deligne et al. | |
| 6,324,519 B1 * | 11/2001 | Eldering | 705/14.66 |
| 6,327,590 B1 | 12/2001 | Chidlovskii et al. | |
| 6,446,065 B1 | 9/2002 | Nishioka et al. | |
| 6,490,698 B1 | 12/2002 | Horvitz et al. | |
| 6,502,033 B1 | 12/2002 | Phuyal | |
| 6,523,172 B1 | 2/2003 | Martinez-Guerra et al. | |
| 6,571,279 B1 | 5/2003 | Herz et al. | |
| 6,601,012 B1 | 7/2003 | Horvitz et al. | |
| 6,662,195 B1 | 12/2003 | Langseth et al. | |
| 6,665,640 B1 | 12/2003 | Bennett et al. | |
| 6,694,316 B1 | 2/2004 | Langseth et al. | |
| 6,701,311 B2 | 3/2004 | Biebesheimer et al. | |
| 6,701,315 B1 | 3/2004 | Austin | |
| 6,708,203 B1 | 3/2004 | Maker et al. | |
| 6,731,940 B1 | 5/2004 | Nagendran | |
| 6,741,980 B1 | 5/2004 | Langseth et al. | |
| 6,757,661 B1 | 6/2004 | Blaser et al. | |
| 6,773,344 B1 | 8/2004 | Gabai et al. | |
| 6,781,920 B2 | 8/2004 | Bates et al. | |
| 6,785,670 B1 | 8/2004 | Chiang et al. | |
| 6,789,073 B1 | 9/2004 | Lunenfeld | |
| 6,813,501 B2 | 11/2004 | Kinnunen et al. | |
| 6,816,850 B2 * | 11/2004 | Culliss | 707/711 |
| 6,829,333 B1 | 12/2004 | Frazier | |
| 6,834,195 B2 * | 12/2004 | Brandenberg et al. | 455/456.3 |
| 6,842,761 B2 | 1/2005 | Diamond et al. | |
| 6,845,370 B2 | 1/2005 | Burkey et al. | |
| 6,850,252 B1 | 2/2005 | Hoffberg | |
| 6,853,913 B2 | 2/2005 | Cherveny et al. | |
| 6,853,982 B2 | 2/2005 | Smith et al. | |
| 6,882,977 B1 | 4/2005 | Miller | |
| 6,904,160 B2 | 6/2005 | Burgess | |
| 6,931,254 B1 | 8/2005 | Egner et al. | |
| 6,961,660 B2 | 11/2005 | Underbrink et al. | |
| 6,961,731 B2 | 11/2005 | Holbrook | |
| 6,985,839 B1 | 1/2006 | Motamedi et al. | |
| 7,010,492 B1 | 3/2006 | Bassett et al. | |
| 7,027,801 B1 | 4/2006 | Hall et al. | |
| 7,058,508 B2 | 6/2006 | Combs et al. | |
| 7,058,626 B1 | 6/2006 | Pan et al. | |
| 7,062,510 B1 | 6/2006 | Eldering | |
| 7,065,345 B2 | 6/2006 | Carlton et al. | |
| 7,065,483 B2 | 6/2006 | Decary et al. | |
| 7,069,308 B2 | 6/2006 | Abrams | |
| 7,073,129 B1 | 7/2006 | Robarts et al. | |
| 7,110,776 B2 | 9/2006 | Sambin | |
| 7,143,091 B2 | 11/2006 | Charnock et al. | |
| 7,149,696 B2 | 12/2006 | Shimizu et al. | |
| 7,181,438 B1 * | 2/2007 | Szabo | 1/1 |
| 7,185,286 B2 * | 2/2007 | Zondervan et al. | 715/762 |
| 7,194,512 B1 | 3/2007 | Creemer et al. | |
| 7,203,597 B2 | 4/2007 | Sato et al. | |
| 7,209,915 B1 | 4/2007 | Taboada et al. | |
| 7,219,013 B1 | 5/2007 | Young et al. | |
| 7,236,969 B1 | 6/2007 | Skillen et al. | |
| 7,254,581 B2 | 8/2007 | Johnson et al. | |
| 7,257,570 B2 | 8/2007 | Riise et al. | |
| 7,305,445 B2 | 12/2007 | Singh et al. | |
| 7,320,025 B1 | 1/2008 | Steinberg et al. | |
| 7,343,364 B2 | 3/2008 | Bram et al. | |
| 7,395,507 B2 | 7/2008 | Robarts et al. | |
| 7,404,084 B2 | 7/2008 | Fransdonk | |
| 7,437,312 B2 | 10/2008 | Bhatia et al. | |
| 7,451,102 B2 | 11/2008 | Nowak | |
| 7,461,168 B1 | 12/2008 | Wan | |
| 7,472,113 B1 * | 12/2008 | Watson et al. | 1/1 |
| 7,496,548 B1 | 2/2009 | Ershov | |
| 7,522,995 B2 | 4/2009 | Nortrup | |
| 7,529,811 B2 | 5/2009 | Thompson | |
| 7,562,122 B2 | 7/2009 | Oliver et al. | |
| 7,577,665 B2 * | 8/2009 | Ramer et al. | 1/1 |
| 7,584,215 B2 | 9/2009 | Saari et al. | |
| 7,624,104 B2 | 11/2009 | Berkhin et al. | |
| 7,624,146 B1 | 11/2009 | Brogne et al. | |
| 7,634,465 B2 | 12/2009 | Sareen et al. | |
| 7,657,907 B2 | 2/2010 | Fennan et al. | |
| 7,681,147 B2 | 3/2010 | Richardson-Bunbury et al. | |
| 7,725,492 B2 | 5/2010 | Sittig et al. | |
| 7,729,901 B2 | 6/2010 | Richardson-Bunbury et al. | |
| 7,769,740 B2 | 8/2010 | Martinez | |
| 7,769,745 B2 | 8/2010 | Mor Naaman | |
| 7,783,622 B1 | 8/2010 | Vandermolen et al. | |
| 7,792,040 B2 | 9/2010 | Nair | |
| 7,802,724 B1 | 9/2010 | Nohr | |
| 7,822,871 B2 | 10/2010 | Stolorz et al. | |
| 7,831,586 B2 | 11/2010 | Reitter et al. | |
| 7,840,524 B2 * | 11/2010 | Egger et al. | 707/709 |
| 7,865,308 B2 | 1/2011 | Athsani | |
| 7,925,708 B2 | 4/2011 | Davis | |
| 2001/0013009 A1 | 8/2001 | Greening et al. | |
| 2001/0035880 A1 | 11/2001 | Musatov et al. | |
| 2001/0047384 A1 | 11/2001 | Croy | |
| 2001/0052058 A1 | 12/2001 | Ohran | |
| 2002/0014742 A1 | 2/2002 | Conte et al. | |
| 2002/0019849 A1 | 2/2002 | Tuvey et al. | |
| 2002/0019857 A1 | 2/2002 | Harjanto | |
| 2002/0023091 A1 | 2/2002 | Silberberg et al. | |
| 2002/0023230 A1 | 2/2002 | Bolnick et al. | |
| 2002/0035605 A1 | 3/2002 | McDowell et al. | |
| 2002/0049968 A1 | 4/2002 | Wilson et al. | |
| 2002/0052786 A1 | 5/2002 | Kim et al. | |
| 2002/0052875 A1 | 5/2002 | Smith et al. | |
| 2002/0054089 A1 | 5/2002 | Nicholas | |
| 2002/0065844 A1 | 5/2002 | Robinson et al. | |
| 2002/0069218 A1 | 6/2002 | Sull et al. | |
| 2002/0099695 A1 | 7/2002 | Abajian et al. | |
| 2002/0103870 A1 | 8/2002 | Shouji | |
| 2002/0111956 A1 | 8/2002 | Yeo et al. | |
| 2002/0112035 A1 | 8/2002 | Carey | |
| 2002/0133400 A1 | 9/2002 | Terry et al. | |
| 2002/0138331 A1 | 9/2002 | Hosea et al. | |
| 2002/0152267 A1 | 10/2002 | Lennon | |
| 2002/0169840 A1 | 11/2002 | Sheldon et al. | |
| 2002/0173971 A1 | 11/2002 | Stirpe et al. | |
| 2002/0178161 A1 | 11/2002 | Brezin et al. | |
| 2002/0198786 A1 | 12/2002 | Tripp et al. | |
| 2003/0008661 A1 | 1/2003 | Joyce et al. | |
| 2003/0009367 A1 | 1/2003 | Morrison | |
| 2003/0009495 A1 | 1/2003 | Adjaoute | |
| 2003/0027558 A1 | 2/2003 | Eisinger | |
| 2003/0032409 A1 | 2/2003 | Hutcheson et al. | |
| 2003/0033331 A1 | 2/2003 | Sena et al. | |
| 2003/0033394 A1 | 2/2003 | Stine et al. | |
| 2003/0065762 A1 | 4/2003 | Stolorz et al. | |
| 2003/0069877 A1 | 4/2003 | Grefenstette et al. | |
| 2003/0069880 A1 * | 4/2003 | Harrison et al. | 707/3 |
| 2003/0078978 A1 | 4/2003 | Lardin et al. | |
| 2003/0080992 A1 | 5/2003 | Haines | |
| 2003/0126250 A1 | 7/2003 | Jhanji | |
| 2003/0149574 A1 | 8/2003 | Rudman | |
| 2003/0154293 A1 | 8/2003 | Zmolek | |
| 2003/0165241 A1 | 9/2003 | Fransdonk | |
| 2003/0191816 A1 | 10/2003 | Landress et al. | |
| 2004/0010492 A1 | 1/2004 | Zhao et al. | |
| 2004/0015588 A1 | 1/2004 | Cotte | |
| 2004/0030798 A1 | 2/2004 | Andersson et al. | |
| 2004/0034752 A1 | 2/2004 | Ohran | |
| 2004/0043758 A1 | 3/2004 | Sorvari et al. | |
| 2004/0044736 A1 | 3/2004 | Austin-Lane et al. | |
| 2004/0070602 A1 | 4/2004 | Kobuya et al. | |
| 2004/0139025 A1 | 7/2004 | Coleman | |
| 2004/0139047 A1 | 7/2004 | Rechsteiner | |
| 2004/0148341 A1 | 7/2004 | Cotte | |
| 2004/0152477 A1 | 8/2004 | Wu et al. | |
| 2004/0183829 A1 | 9/2004 | Kontny et al. | |

| | | |
|---|---|---|
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina et al. |
| 2005/0060381 A1 | 3/2005 | Huynh et al. |
| 2005/0065950 A1* | 3/2005 | Chaganti et al. ............. 707/100 |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin et al. |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0270579 A1 | 10/2008 | Herz et al. |
| 2008/0285886 A1 | 11/2008 | Allen |
| 2008/0300250 A1 | 12/2008 | Hardy et al. |
| 2008/0320001 A1 | 12/2008 | Gaddam |

| | | | |
|---|---|---|---|
| 2009/0005987 A1 | 1/2009 | Vengroff et al. | |
| 2009/0006336 A1 | 1/2009 | Forstall et al. | |
| 2009/0012934 A1 | 1/2009 | Yerigan | |
| 2009/0012965 A1 | 1/2009 | Franken | |
| 2009/0043844 A1 | 2/2009 | Zimmet et al. | |
| 2009/0044132 A1 | 2/2009 | Combel et al. | |
| 2009/0063254 A1 | 3/2009 | Paul et al. | |
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandeil et al. | |
| 2009/0249482 A1 | 10/2009 | Sarathy | |
| 2009/0265431 A1 | 10/2009 | Janie et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0094844 A1* | 4/2010 | Cras | 707/705 |
| 2010/0118025 A1 | 5/2010 | Smith et al. | |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |
| 2010/0223261 A1* | 9/2010 | Sarkar | 707/726 |

FOREIGN PATENT DOCUMENTS

| | | |
|---|---|---|
| JP | 2002312559 | 10/2002 |
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

Nedos, A; Singh K., Clarke S, "Proximity Based Group Communications for Mobile AD HOC Networks"; Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-02-0092, Universita di Trento, Oct. 2002; 8 pages.
U.S. Appl. No. 11/952,007, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/953,454, filed Dec. 10, 2007, Davis.
U.S. Appl. No. 11/953,494, filed Dec. 10, 2007, Davis.
U.S. Appl. No. 12/236,668, filed Sep. 24, 2008, Davis.
U.S. Appl. No. 12/059,594, filed Mar. 31, 2008, Martinez.
U.S. Appl. No. 12/057,878, filed Mar. 28, 2008, Martinez.
U.S. Appl. No. 12/057,943, filed Mar. 28, 2008, Martinez.
U.S. Appl. No. 11/969,751, filed Jan. 4, 2008, Martinez.
U.S. Appl. No. 12/145,145, filed Jun. 24, 2008, Davis.
U.S. Appl. No. 12/163,249, filed Jun. 27, 2008, Kalaboukis.
U.S. Appl. No. 12/182,969, filed Jul. 30, 2008, Higgins.
U.S. Appl. No. 12/182,813, filed Jul. 30, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241.590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,259, filed Nov. 18, 2008, Martinez.
U.S. Appl. No. 12/241,198, filed Sep. 30, 2008, Higgins.
U.S. Appl. No. 12/339,355, filed Dec. 19, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/273,371, filed Nov. 18, 2008, Nair.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"Dave.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).

"Reality Digital Debuts Opus", www.lightreading.com. Sep. 25, 2006, pp. 1.

"Reality Digital—Making Media Move", www.realitydigital.com, Nov. 28, 2006, pp. 1-2.

Nedos, A; Singh K., Clarke S, Proximity Based Group Communications for Mobile AD HOC Networks'; Proximity-Based Group Communication; Global Smart Spaces; D.14; Oct. 3, 2003; 31 pages.

Backstrom et al., Spatial Variation in Search Engine Queries, WWW-2008, Beijing, China (Apr. 21-25, 2008).

Gan et al., Analysis of Geographic Queries in a Search Engine Log, LocWeb 2008, Beijing, China (Apr. 22, 2008).

Jones et al., Geographic Intention and Modification in Web Search, International Journal of Geographical Information Science, vol. 22, No. 3, pp. 1-20 (Jul. 2008).

Sanderson et al., Analyzing Geographic Queries; Department of Information Studies; University of Sheffield, UK; 2 pages.

Go With the Flow, The Economist Technology Quarterly, vol. 382, Issue 8519, 4 pages, (Mar. 10, 2007).

International Search Report and Written Opinion (PCT/US2009/060476) dated May 4, 2010; 12 pages.

International Search Report and Written Opinion (PCT/US2009/060374) dated Apr. 30, 2010; 12 pages.

International Search Report (PCT/US2009/060379) dated Apr. 30, 2010; 3 pages.

International Search Report and Written Opinion (PCT/US2008/085135) dated May 25, 2009; 7 pages.

International Search Report (PCT/US2009/055503) dated Apr. 8, 2010; 3 pages.

Written Opinion (PCT/US2008/085915) dated Jun. 29, 2009; 4 pages.

Written Opinion (PCT/US2008/086948) dated May 21, 2009; 5 pages.

International Search Report and Written Opinion (PCT/US2009/051247) dated Jan. 25, 2010; 9 pages.

International Search Report and Written Opinion (PCT/US2009/046258) dated Dec. 23, 2009; 7 pages.

U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2004, O'Sullivan.
U.S. Appl. No. 12/434,580, filed May 1, 2004, O'Sullivan.
U.S. Appl. No. 12/407,690, filed Mar. 19, 2004, Davis.
U.S. Appl. No. 12/407,681, filed Mar. 19, 2009, Athsani.

International Search Report (PCT/US2009/030405) dated Sep. 23, 2009; 2 pages.

U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.

International Search Report PCT/US2009/030406 dated Sep. 29, 2009; 5 pages.

International Search Report and Written Opinion PCT/US2009/034445 dated Oct. 12, 2009; 7 pages.

Office Action U.S. Appl. No. 12/041,054 dated Oct. 27, 2010; 15 pages.

Office Action U.S. Appl. No. 12/041,062 dated Oct. 28, 2010; 12 pages.

International Search Report PCT/US2009/034444 dated Sep. 18, 2009; 2 pages.

Office Action U.S. Appl. No. 12/041,088 dated Oct. 4, 2010; 18 pages.

Almieda, R.B. et al. "A Community-Aware Search Engine," WWW2004, New York., NY, May 17-22, 2004, pp. 413-421.

Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.

Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.

Bharat, K. (Date Unknown). "SearchPad: Explicit Capture of Search Context to Support Web Search," located at <http://www9.org/w9cdrom/173/173.html >, last visited Aug. 1, 2007, 13 pages.

Budzik, J. et al. (2000). "User Interactions with Everyday Applications as Context for Just-in-Time Information Access," Proceeding of the 2000 Conference on Intelligent User Interfaces, eight pages.

Finkelstein, L. et al. (2001). "Placing Search in Context: The Concept Revisited," WWW/O, Hong Kong, May 2-5, 2001, pp. 406-414.

Freyne, J. et al. (2004). "Further Experiments on Collaborative Ranking in Community-Based Web Search," Artificial Intelligence Review, pp. 1-23.

Lieberman, H. (1995) "Letizia: An Agent that Assists Web Browsing," Proceedings of the Fourteenth International Joint Conference on Artificial Intelligence, Aug. 20-25, 1995, six pages.

Mitra, M. et al. (1998). "Improving Automatic Query Expansion," Proceedings of the AMC SIGIR, nine pages.

Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032__40_agents&ubicomp/remembrance-agent . . .>, last visited Aug. 1, 2007, six pages.

Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.

Yahoo! Inc. (Dec. 7, 2005). "Yahoo! Widget Engine 3.0 Reference Manual Version 3.0," 300 pages.

U.S. Appl. No. 12/407,690, filed Mar. 19, 2009; 50 pages.
U.S. Appl. No. 12/407,681, filed Mar. 19, 2009; 56 pages.

International Search Report PCT/US2008/088228 dated Sep. 30, 2009—2 pages.

Written Opinion PCT/US2008/088228 dated Sep. 30, 2009—5 pages.

U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.

Allen James F., "Maintaining Knowledge About Temporal Intervals", Communications of the ACM, Nov. 1983, vol. 26, No. 11 pp. 832-843; 12 pages.

Press Release, "QUALCOMM Conducts First Live Demonstration of FL Technology on a Wireless Handset", Qualcomm Inc., San Diego, Sep. 27, 2005; 3 pages.

MediaFlo, FLO Technology Overview, Qualcomm Inc. Copyright 2007; 24 pages.

Notification of Transmittal of the International Search Report and The Written Opinion of the International Search Authority, or Declaration (PCT/US2007/084797) dated Mar. 21, 2008; 11 pages.

International Search Report (PCT/US2007/084807) dated May 27, 2008; 3 pages.

International Preliminary Report on Patentability (PCT/US2007/084807) dated May 26, 2009; 5 pages.

International Search Report (PCT/US2010/026063) dated May 27, 2008; 3 pages.

Rekimoto, et al., "CyberCode: designing augmented reality environments with visual tags. "Proceedings of DARE 2000 on Designing augmented reality environments, Elsinore, Denmark, pp. 1-11 Apr. 12-14, 2000.

"Semacode-URL Barcodes-practical ubiquitous computing", located at http://semacode.org visited on Apr. 13, 2007; 3 pages.

Technical White Paper: Choosing the best 2D barcode format for mobile apps, Semacode, Jul. 15, 2006; pp. 1-7 located at http://semacode.org/about/technical/whitepaper/best2_d_code.pdf.

Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.

Cooper, M. et al. (Nov. 2-8, 2003). "Temporal Event Clustering for Digital Photo Collections," MM'03 Berkeley, California, pp. 364-373.

Davis, M. et al. (Oct. 10-16, 2004). "From Context to Content: Leveraging Context to Infer Media Metadata," MM'04 New York, New York. 9 pages.

Davis, M. et al. "From Context to Content: Leveraging Context for Mobile Media Metadata," 9 pages.

Davis. M. et al. (Apr. 2-7, 2005). "MMM2: Mobile Media Metadata for Media Sharing," CHI 2005 Portland, Oregon. 4 pages.

Davis, M. et al. "Mobile Media Metadata for Mobile Imaging." Jun. 27-30, 2004; 4 pages.

Davis, M. et al. "Using Context and Similarity for Face and Location Identification." 10 pages.

Flickr. 'Welcome to Flickr—Photo Sharing, located at <http://www.flickr.com > visited on Feb. 26, 2007, one page.

Gargi, U. (Aug. 7, 2003). "Consumer Media Capture: Time-Based Analysis and Event Clustering," Technical Report HPL-2003-165 HP Laboratories Palo Alto, pp. 1-15.

Goldberger, J. et al. 'The Hungarian Clustering Method, located at <http://scholar.googles.com/scholar?num=20&h1=en&lr=&9=cache:vbwsIsm1CisJ:www.openuacil/Personal_sites/tamirtassa/Publications/hcm.pdf+goldberger+clustering+method+hungarian> visited on Mar. 1, 2007, twelve pages.

Graham, A. et al. (Jul. 13-17, 2002). 'Time as Essence for Photo Browsing Through Personal Digital Libraries, JCDL '02 Portland, Oregon. 11 pages.

Jaffe, A. et al. (May 23-26, 2006). "Generating Summaries for Large Collections of Geo-Referenced Photographs," WWW 2006 Edinburgh, Scotland, 2 pages.

Jaffe, A. et al. (Oct. 26-27, 2006). "Generating Summaries and Visualization for Large Collections of Geo-Referenced Photographs," MIR '06 Santa Barbara, California. 11 pages.

Joshi, D. et al. (Oct. 15-16, 2004). "The Story Picturing Engine: Finding Elite Images to Illustrate a Story Using Miitual Reinforcement," MIR '04 New York, New York. 9 pages.

Naaman, M. et al. (Nov. 2003). "From Where to What: Metadata Sharing for Digital Photographs with Geographic Coordinates," In On the Move to Meaningful Internet Systems 2003: Coop/S, DOA, and Odbase R. Meersman et al. eds., pp. 196-217.

Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.

Nair, R. et al. (Nov. 6-11, 2005). "Photo L01: Browsing Multi-User Photo Collections," MM'05 Singapore, pp. 223-224.

O'Hare, N. et al. "Combination of Content Analysis and Context Features for Digital Photograph Retrieval." 7 pages.

Pigeau, A. et al. (Jun. 17, 2005). "Organizing a Personal Image Collection with Statistical Model-Based ICL Clustering on Spatio-Temporal Camera Phone Meta-Data." 25 pages.

Sarvas, R. et al. (Jun. 6-9, 2004). "Metadata Creation System for Mobile Images," MobiSys'04 Boiton, Massachusetts, pp. 36-48.

Toyama, K. et al. (Nov. 2-8, 2003). "Geographic Location Tags on Digital Images," MM'03' Berkeley: California. 12 pages.

U.S. Appl. No. 11/593,668, filed Nov. 6, 2006 for Naaman, et al.

U.S. Appl. No. 11/593,869, filed Nov. 6, 2006 for Naaman, et al.

"Gutenkarte" Book Catalog, 2006 MetaCarta, Inc., www.gutenkarte.org 11pgs.

Baron, N.S. et al. (Aug. 30, 2005). "Tethered or Mobile? Use of Away Messages in Instant Messaging by American College Students," Chapter 20.1 in Mobile Communication, Springer: London, England, 31:293-297.

Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.

Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h > . . . , last visited on Feb. 2, 2010, ten pages.

Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.

Wooldridge, M. et al. (2005). "STALK. The Camera-phone Scavenger Hunt!" located at <http://www.stalk.com >, last visited on Dec. 28, 2009, two pages.

www.stalk.com (retrieved on Dec. 29, 2009) pp. 1-2.

Anonymous. (Date Unknown). "CommunityWalk—About," located at <http://www.communitywalk.com/about >, last visited on Mar. 3, 2008, one page.

Anonymous. (Date Unknown). "CommunityWalk Mapping Made Easy," located at <http://www.communitywalk.com/>, last visited on Mar. 3, 2008, one page.

Anonymous. (Date Unknown). "Google Earth User Guide" located at <http://earth.google.com/userguide/v4/>, last visited on Feb. 27, 2008, twelve pages.

Anonymous. (Date Unknown). "Google Earth—Wikipedia, the Free Encyclopedia," located at <http://en.wikipedia.org/wiki/Google_earth >, last visited on Mar. 3, 2008, fourteen pages.

Anonymous. (Date Unknown). "Google Earth User Guide—Using Image Overlays and 3D Models," located at <http://earth.google.com/userguide/v4/ug_imageoverlays.html >, nine pages.

Anonymous. (Date Unknown). "Google Maps," located at <http://en.wikipedia.org/wiki/Google_maps >, last visited on Feb. 27, 2008, eleven pages.

Anonymous. (Date Unknown). "Live Search Maps," located at <http://en.wikipedia.org/wiki/Windows_live_maps >, last visited on Mar. 3, 2008, six pages.

Anonymous. (Date Unknown). "WikiMapia," located at <http://en.wikipedia.org/wiki/WikiMapia >, last visited on Mar. 3, 2008, three pages.

Anonymous. (2007). "Ask.com Maps & Directions," located at <http://maps.ask.com/maps >, last visited on Mar. 3, 2008, one page.

Anonymous. (2007). "Wayfaring Follow You, Follow Me," located at <http://www.wayfaring.com/>, last visited on Mar. 3, 2008, three pages.

Anonymous. (2008). "Platial the People's Atlas," located at <www.platial.com >, last visited on Mar. 3, 2008, one page.

Anonymous. (2008). "Wikimpaia.org ," located at <http://wikimpaia.org/>, last visited on Mar. 3, 2008, one page.

* cited by examiner

SYSTEM AND METHOD FOR CONTEXT BASED QUERY AUGMENTATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for managing data relating to users on a network and, more particularly, to systems and methods for managing data relating to users on a network which is drawn, in part, from third party sources.

BACKGROUND OF THE INVENTION

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY OF THE INVENTION

In one embodiment, the invention is a method. A question is received, over a network, from a questioning user, the question comprising an identification of a user and at least one question criteria. A first query is formulated so as to search, via the network, for user profile data, social network data, spatial data, temporal data and topical data that is available via the network and relates to the question criteria and the identified user so as to identify user context data relevant to question criteria. The question is modified, via the network, using the user context data to create at least one modified question having at least one additional criteria based on the user context data. A second query is formulated so as to search, via the network, for knowledge data, user profile data, social network data, spatial data, temporal data and topical data that is available via the network and relates to the modified question criteria and the identified user so as to identify knowledge data relevant to the identified user and the modified question criteria. The knowledge data is transmitted, over the network, to the questioning user.

In another embodiment, the invention is a method. A request is received, over a network from a requesting user for at least one suggested question, the question comprising an identification of a user. A first query is formulated, so as to so as to search, via the network for knowledge data, user profile data, social network data, spatial data, temporal data and topical data available to the network that relates to the identified user so as to identify knowledge data relevant to the identified user's current context. The identified knowledge data is transmitted, over the network to the requesting user.

In another embodiment, the invention is a system comprising: a user manager that receives questions, over a network, from questioning users, the question comprising an identification of a user and at least one question criteria; a query analyzer manager that, for each question received by the user manager, formulates a query so as to search, via the network, for user profile data, social network data, spatial data, temporal data and topical data that is available via the network and relates to the question criteria and the identified user so as to identify user context data relevant to question criteria, wherein the query analyzer manager modifies the question, using the user context data to create at least one modified question having at least one additional criteria based on the user context data; and a question manager that, for each modified question, formulates a query so as to search, via the network, for knowledge data, user profile data, social network data, spatial data, temporal data and topical data that is available via the network and relates to the modified question criteria and the identified user so as to identify knowledge data relevant to the identified user and the modified question criteria, wherein the identified knowledge data is transmitted by the user manager, via the network, to the questioning user.

In another embodiment, the invention is a system comprising: a user manager that receives requests for at least one suggested question, over a network, from requesting users, the request comprising an identification of a user; and a question manager that, for each request received by the user manager, formulate queries so as to search, via the network for knowledge data, user profile data, social network data, spatial data, temporal data and topical data available to the network that relates to the identified user so as to identify knowledge data relevant to the identified user's current context, wherein the user manager transmits, over the network, the identified knowledge data to the requesting user.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
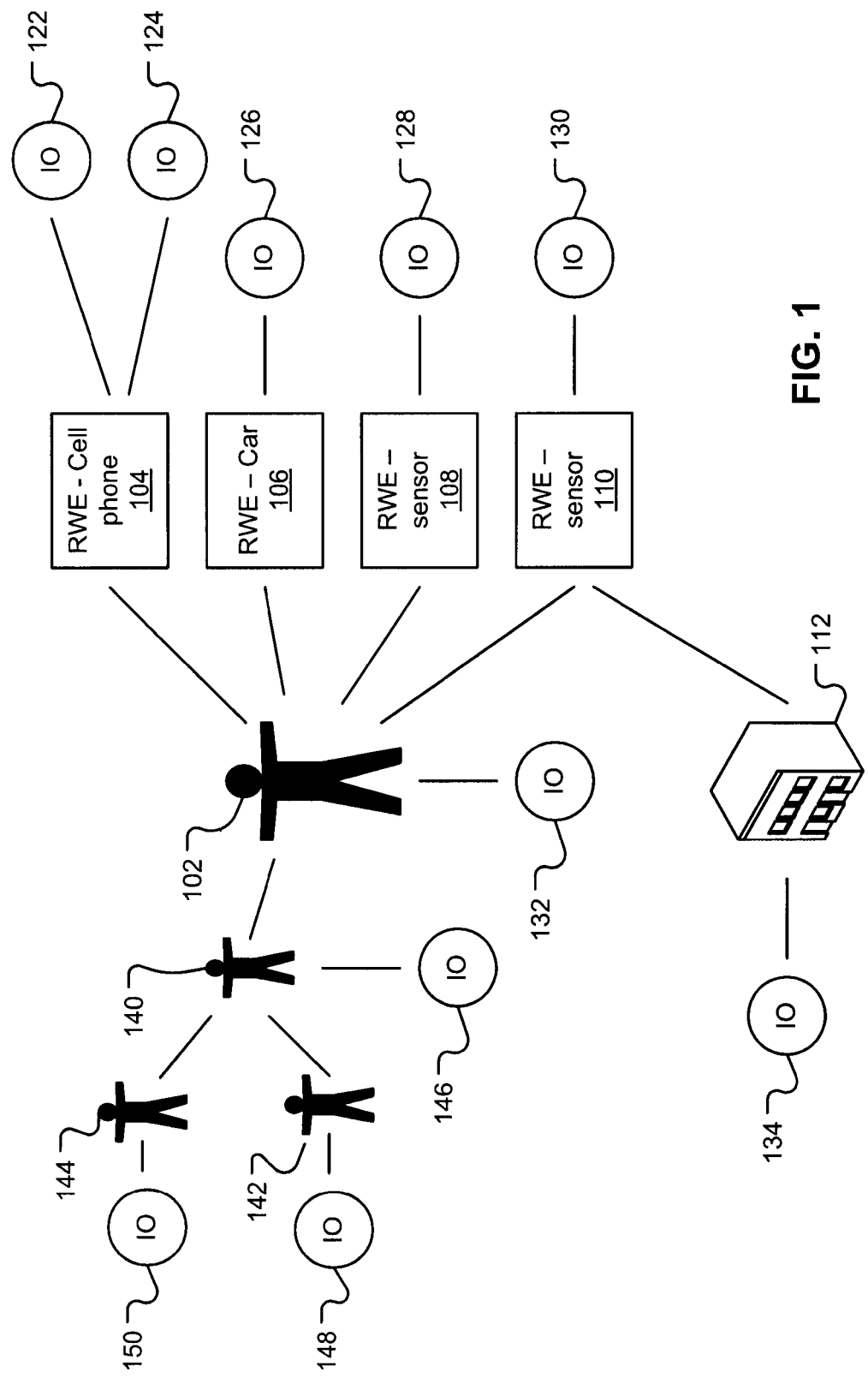
FIG. 1 illustrates relationships between real-world entities (RWE) and information objects (IO) on one embodiment of a W4 Communications Network (W4 COMN.)

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure the term "media" and "media content" should be understood to refer to binary data which contains content which can be of interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure an engine is a software, hardware, or firmware (or combinations thereof) system, process or functionality that performs or facilitates the processes, features, and/or functions described herein (with or without human interaction or augmentation).

Embodiments of the present invention utilize information provided by a network which is capable of providing data collected and stored by multiple devices on a network. Such information may include, without limitation, temporal information, spatial information, and user information relating to a specific user or hardware device. User information may include, without limitation, user demographics, user preferences, user social networks, and user behavior. One embodiment of such a network is a W4 Communications Network.

A "W4 Communications Network" or W4 COMN, provides information related to the "Who, What, When and Where" of interactions within the network. In one embodiment, the W4 COMN is a collection of users, devices and processes that foster both synchronous and asynchronous communications between users and their proxies providing an instrumented network of sensors providing data recognition and collection in real-world environments about any subject, location, user or combination thereof.

In one embodiment, the W4 COMN can handle the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

In one embodiment, the W4 COMN uses a data modeling strategy for creating profiles for not only users and locations, but also any device on the network and any kind of user-defined data with user-specified conditions. Using Social, Spatial, Temporal and Logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, a W4 COMN network relates to what may be termed "real-world entities", hereinafter referred to as RWEs. A RWE refers to, without limitation, a person, device, location, or other physical thing known to a W4 COMN. In one embodiment, each RWE known to a W4 COMN is assigned a unique W4 identification number that identifies the RWE within the W4 COMN.

RWEs can interact with the network directly or through proxies, which can themselves be RWEs. Examples of RWEs that interact directly with the W4 COMN include any device such as a sensor, motor, or other piece of hardware connected to the W4 COMN in order to receive or transmit data or control signals. RWE may include all devices that can serve as network nodes or generate, request and/or consume data in a networked environment or that can be controlled through a network. Such devices include any kind of "dumb" device purpose-designed to interact with a network (e.g., cell phones, cable television set top boxes, fax machines, telephones, and radio frequency identification (RFID) tags, sensors, etc.).

Examples of RWEs that may use proxies to interact with W4 COMN network include non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) may be considered RWE that use proxies to interact with the network, where software applications executing on the device that serve as the devices' proxies.

In one embodiment, a W4 COMN may allow associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN.

An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

In one embodiment, a W4 COMN network may additionally include what may be termed "information-objects", hereinafter referred to as IOs. An information object (IO) is a logical object that may store, maintain, generate or otherwise provides data for use by RWEs and/or the W4 COMN. In one embodiment, data within in an IO can be revised by the act of an RWE An IO within in a W4 COMN can be provided a unique W4 identification number that identifies the IO within the W4 COMN.

In one embodiment, IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In one embodiment, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

In one embodiment, for every IO there are at least three classes of associated RWEs. The first is the RWE that owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs that access the IO in order to obtain data from the IO for some purpose.

Within the context of a W4 COMN, "available data" and "W4 data" means data that exists in an IO or data that can be collected from a known IO or RWE such as a deployed sensor. Within the context of a W4 COMN, "sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates one embodiment of relationships between RWEs and IOs on a W4 COMN. A user 102 is a RWE provided with a unique network ID. The user 102 may be a human that communicates with the network using proxy devices 104, 106, 108, 110 associated with the user 102, all of which are RWEs having a unique network ID. These proxies can communicate directly with the W4 COMN or can communicate with the W4 COMN using IOs such as applications executed on or by a proxy device.

In one embodiment, the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102.

For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 can be directly associated with one or more persons 140, and indirectly associated with still more persons 142, 144 through a chain of direct associations. Such associations can be explicit (e.g., the user 102 can have identified the associated person 140 as his/her father, or can have identified the person 140 as a member of the user's social network) or implicit (e.g., they share the same address). Tracking the associations between people (and other RWEs as well) allows the creation of the concept of "intimacy", where intimacy may be defined as a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

In one embodiment, each RWE 102, 104, 106, 108, 110, 112, 140, 142, 144 of a W4 COMN can be associated with one or more IOs as shown. FIG. 1 illustrates two IOs 122, 124 as associated with the cell phone device 104. One IO 122 can be a passive data object such as an event record that is used by scheduling/calendaring software on the cell phone, a contact IO used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. IOs may additionally relate to topics of interest to one or more RWEs, such topics including, without limitation, musical artists, genre of music, a location and so forth.

The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill.

RWEs which can only interact with the W4 COMN through proxies, such as people 102, 140, 142, 144, computing devices 104, 106 and locations 112, can have one or more IOs 132, 134, 146, 148, 150 directly associated with them which contain RWE-specific information for the associated RWE. For example, IOs associated with a person 132, 146, 148, 150 can include a user profile containing email addresses, telephone numbers, physical addresses, user preferences, identification of devices and other RWEs associated with the user. The IOs may additionally include records of the user's past interactions with other RWEs on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.).

Another example of IOs associated with a person 132, 146, 148, 150 includes remote applications through which a person can communicate with the W4 COMN such as an account with a web-based email service such as Yahoo! Mail. A location's IO 134 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In one embodiment, RWEs and IOs are correlated to identify relationships between them. RWEs and IOs may be correlated using metadata. For example, if an IO is a music file, metadata for the file can include data identifying the artist, song, etc., album art, and the format of the music data. This metadata can be stored as part of the music file or in one or more different IOs that are associated with the music file or both. W4 metadata can additionally include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
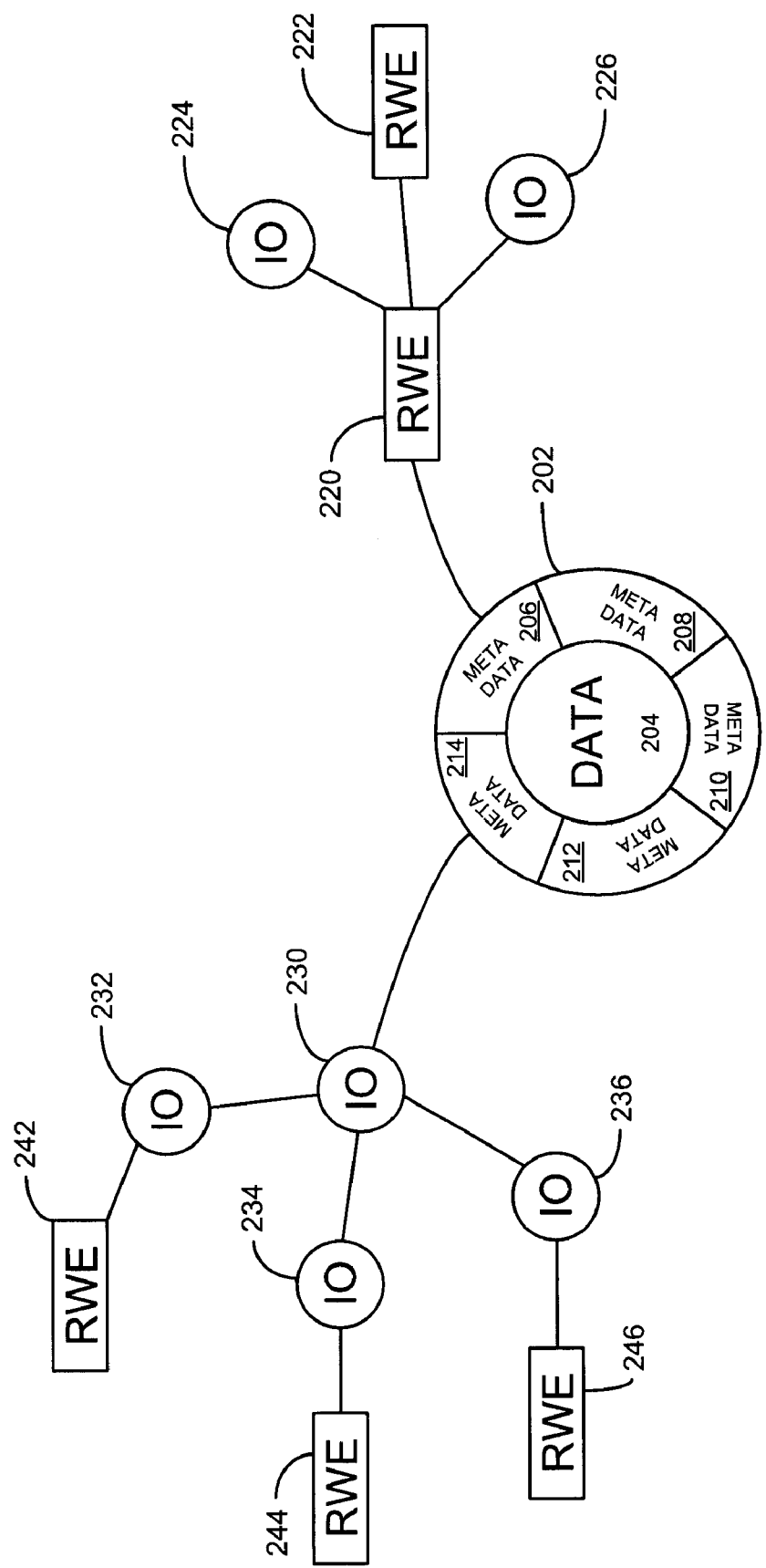
FIG. 2 illustrates metadata defining the relationships between RWEs and IOs on one embodiment of a W4 COMN.

FIG. 2 illustrates one embodiment of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202.

Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. For example, could describe the relations between an image (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
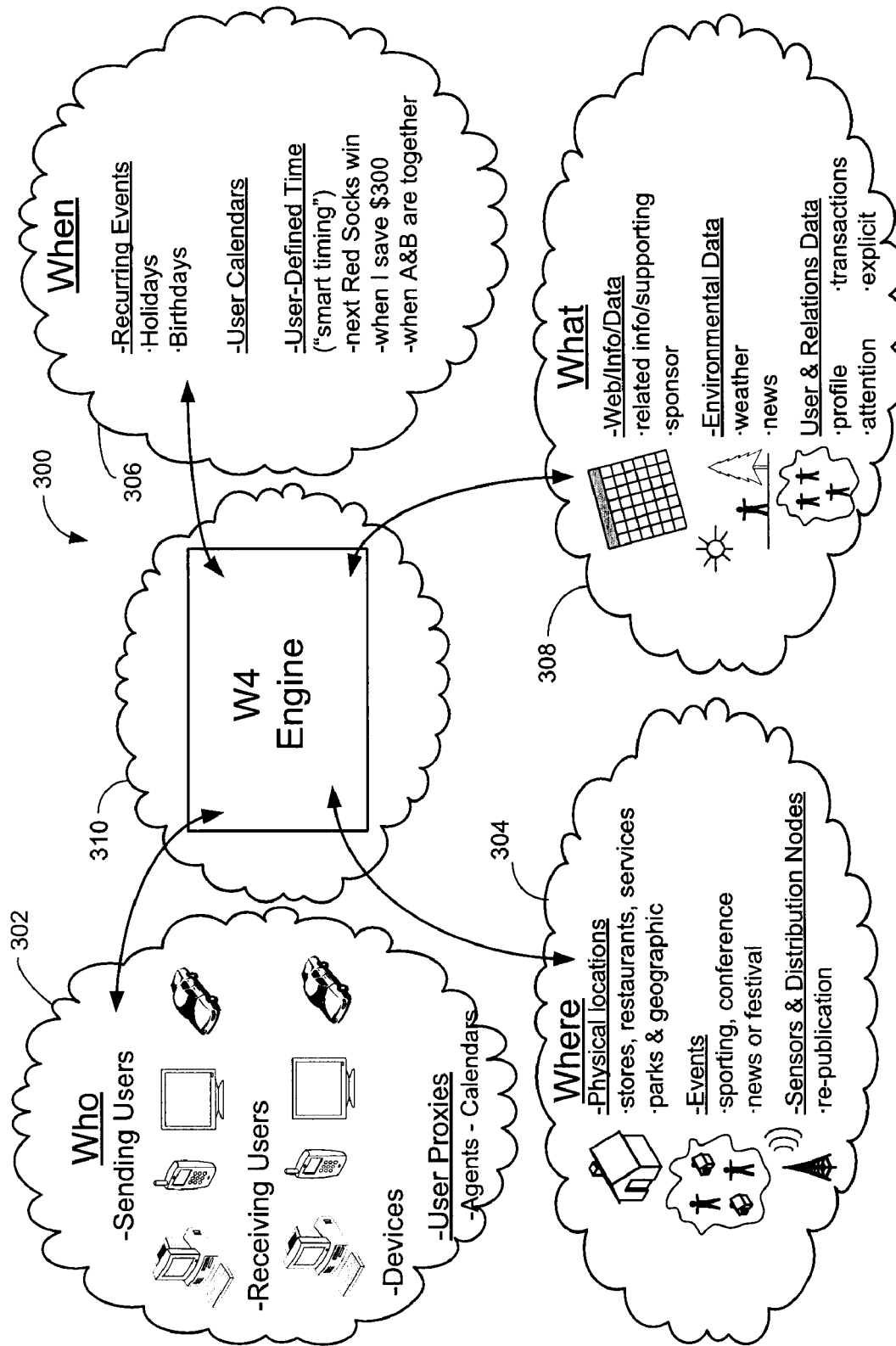
FIG. 3 illustrates a conceptual model of one embodiment of a W4 COMN.

FIG. 3 illustrates one embodiment of a conceptual model of a W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc.

In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs).

The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

Some entities, sensors or data may potentially exist in multiple clouds either disparate in time or simultaneously. Additionally, some IOs and RWEs can be composites in that they combine elements from one or more clouds. Such composites can be classified as appropriate to facilitate the determination of associations between RWEs and IOs. For example, an event consisting of a location and time could be equally classified within the When cloud 306, the What cloud 308 and/or the Where cloud 304.

In one embodiment, a W4 engine 310 is center of the W4 COMN's intelligence for making all decisions in the W4 COMN. The W4 engine 310 controls all interactions between each layer of the W4 COMN and is responsible for executing any approved user or application objective enabled by W4 COMN operations or interoperating applications. In an embodiment, the W4 COMN is an open platform with standardized, published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs may be referred to as entity extraction. Entity extraction can include both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only where only W4 metadata related to the object is visible, but internal data of the IO (i.e., the actual primary or object data contained within the object) are not, and thus metadata extraction is limited to the metadata. Alternatively, if internal data of the IO is visible, it can also be used in entity extraction, e.g. strings within an email are extracted and associated as RWEs to for use in determining the relationships between the sender, user, topic or other RWE or IO impacted by the object or process.

In the embodiment shown, the W4 engine 310 can be one or a group of distributed computing devices, such as a general-purpose personal computers (PCs) or purpose built server computers, connected to the W4 COMN by communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as, without limitation, smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a computer-readable medium (not shown) that is connected to, or part of, any of the computing devices described herein including the W4 engine 310. For example, in one embodiment, the data backbone of the W4 COMN, discussed below, includes multiple mass storage devices that maintain the IOs, metadata and data necessary to determine relationships between RWEs and IOs as described herein.

Figure 4:
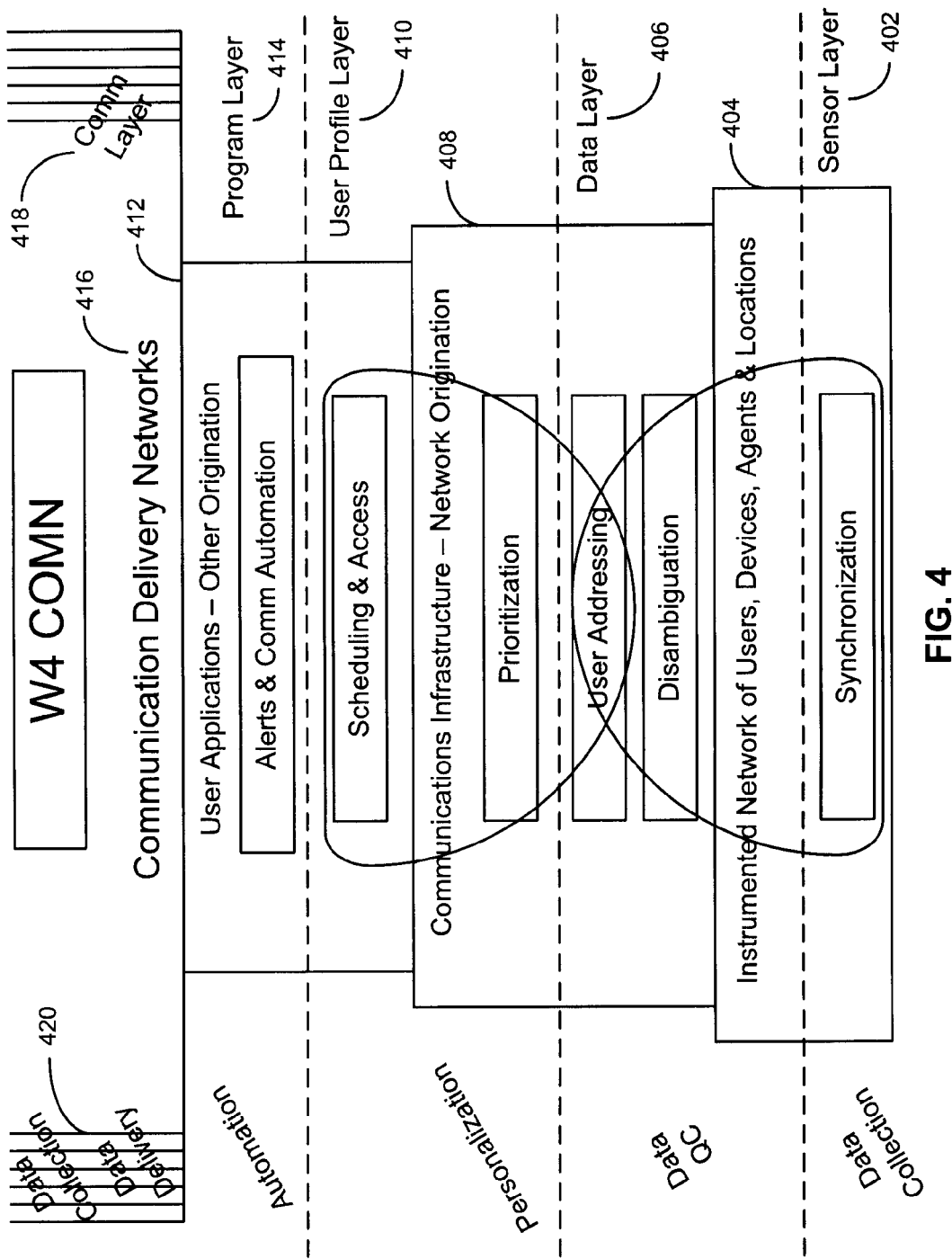
FIG. 4 illustrates the functional layers of one embodiment of the W4 COMN architecture.

FIG. 4 illustrates one embodiment of the functional layers of a W4 COMN architecture. At the lowest layer, referred to as the sensor layer 402, is the network 404 of the actual devices, users, nodes and other RWEs. Sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The data layer 406 stores and catalogs the data produced by the sensor layer 402. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The user profiling layer 410 performs the W4 COMN's user profiling functions. This layer 410 can further be distributed between the network infrastructure 408 and user applications/processes 412 executing on the W4 engine or disparate user computing devices. Personalization is enabled across any single or combination of communication channels and modes including email, IM, texting (SMS, etc.), photo-blogging, audio (e.g. telephone call), video (teleconferencing, live broadcast), games, data confidence processes, security, certification or any other W4 COMM process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available applications approved on the W4 COMN. Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from outside the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely they operate with the sensor processing and user profiling layer 410. The applications 412 also serve as a sensor in that they, through their actions, generate data back to the data layer 406 via the data backbone concerning any data created or available due to the applications execution.

In one embodiment, the applications layer 414 can also provide a user interface (UI) based on device, network, carrier as well as user-selected or security-based customizations. Any UI can operate within the W4 COMN if it is instrumented to provide data on user interactions or actions back to the network. In the case of W4 COMN enabled mobile devices, the UI can also be used to confirm or disambiguate incomplete W4 data in real-time, as well as correlation, triangulation and synchronization sensors for other nearby enabled or non-enabled devices.

At some point, the network effects enough enabled devices allow the network to gather complete or nearly complete data (sufficient for profiling and tracking) of a non-enabled device because of its regular intersection and sensing by enabled devices in its real-world location.

Above the applications layer 414, or hosted within it, is the communications delivery network 416. The communications delivery network can be operated by the W4 COMN operator or be independent third-party carrier service. Data may be delivered via synchronous or asynchronous communication. In every case, the communication delivery network 414 will be sending or receiving data on behalf of a specific application or network infrastructure 408 request.

The communication delivery layer 418 also has elements that act as sensors including W4 entity extraction from phone calls, emails, blogs, etc. as well as specific user commands within the delivery network context. For example, "save and prioritize this call" said before end of call can trigger a recording of the previous conversation to be saved and for the W4 entities within the conversation to analyzed and increased in weighting prioritization decisions in the personalization/user profiling layer 410.

Figure 5:
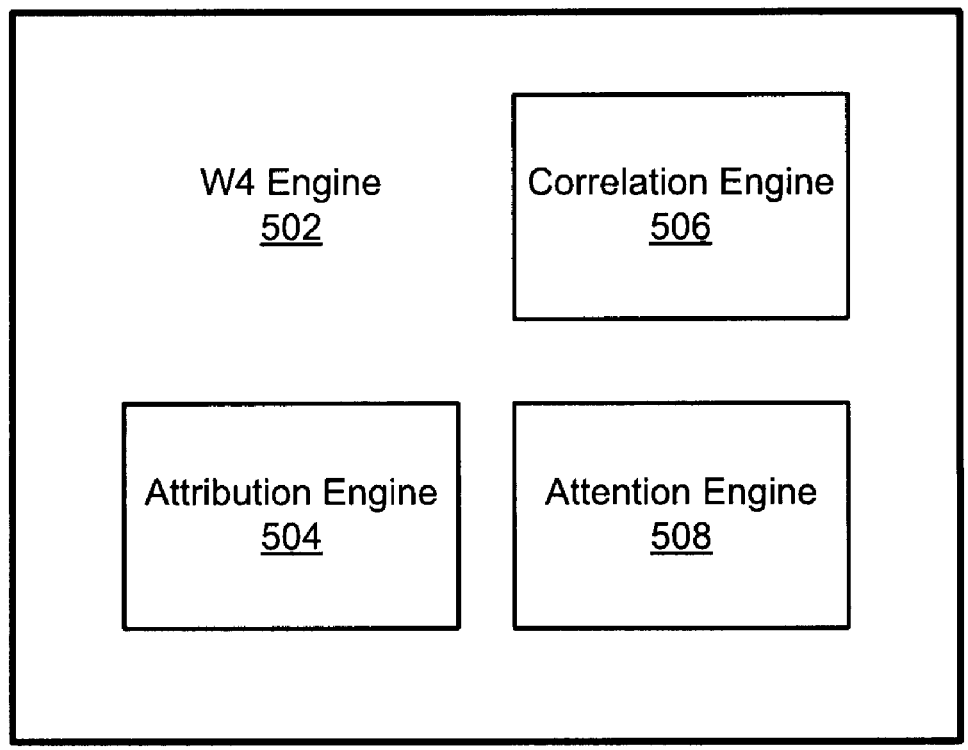
FIG. 5 illustrates the analysis components of one embodiment of a W4 engine as shown in FIG. 2.

FIG. 5 illustrates one embodiment of the analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The correlation engine 506 can operates two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data, using, for example, one or more histograms A histogram is a mapping technique that counts the number of observations that fall into various disjoint categories (i.e. bins.). By selecting each IO, RWE, and other known parameters (e.g., times, dates, locations, etc.) as different bins and mapping the available data, relationships between RWEs, IOs and the other parameters can be identified. A histogram of all RWEs and IOs is created, from which correlations based on the graph can be made.

As a pre-processor, the correlation engine 506 monitors the information provided by RWEs in order to determine if any conditions are identified that can trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
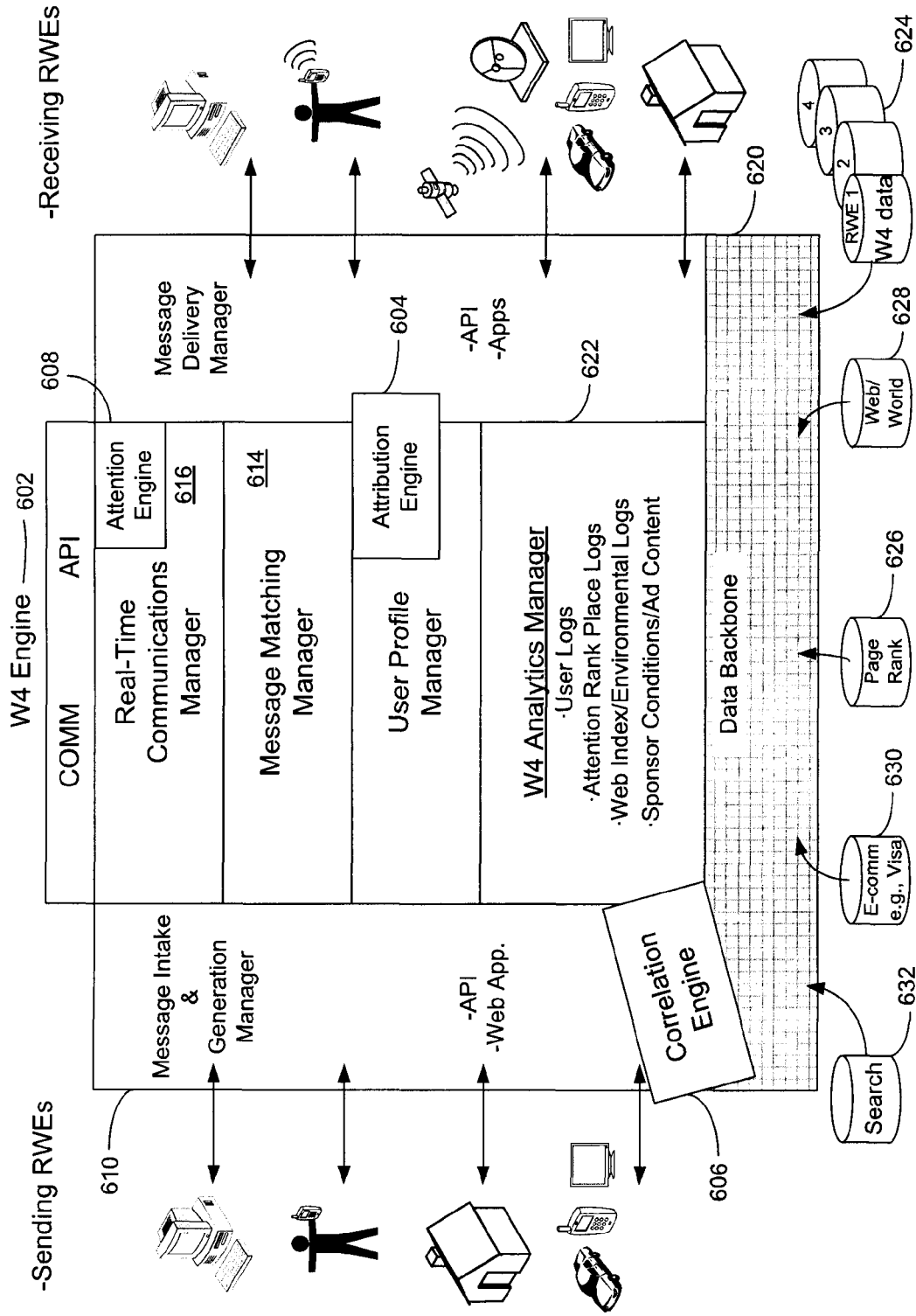
FIG. 6 illustrates one embodiment of a W4 engine showing different components within the sub-engines shown in FIG. 5.

FIG. 6 illustrates one embodiment of a W4 engine showing different components within the sub-engines described above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622. The data backbone 620 includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and datastores in communication with the W4 COMN to provide sufficient storage capacity.

The data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

Logical and IO data refers to the data contained by an IO as well as data associated with the IO such as creation time, owner, associated RWEs, when the IO was last accessed, the topic or subject of the IO (from message content or "re" or subject line, as some examples) etc. For example, an IO may relate to media data. Media data can include any data relating to presentable media, such as audio data, visual data, and audiovisual data. Audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device.

Audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like.

The media data can include non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. Media data can be used, for example, to deduce activities information or preferences information, such as cultural and/or buying preferences information.

Relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

Interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
| --- | --- | --- |
| Cell tower | Time stamps | Interpersonal |
| GPRS | Local clock | communications |
| GPS | Network clock | Media |
| WiFi | User input of time | Relationships |
| Personal area network | | Transactions |
| Network access points | | Device interactions |
| User input of location | | |
| Geo-coordinates | | |

Interaction data includes communication data between any RWEs that is transferred via the W4 COMN. For example, the communication data can be data associated with an incoming or outgoing short message service (SMS) message, email message, voice call (e.g., a cell phone call, a voice over IP call), or other type of interpersonal communication related to an RWE. Communication data can be correlated with, for example, temporal data to deduce information regarding frequency of communications, including concentrated communication patterns, which can indicate user activity information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
| --- | --- |
| Interpersonal communication data | Text-based communications, such as SMS and e-mail<br>Audio-based communications, such as voice calls, voice notes, voice mail<br>Media-based communications, such as multimedia messaging service (MMS) communications<br>Unique identifiers associated with a communication, such as phone numbers, e-mail addresses, and network addresses |
| Media data | Audio data, such as music data (artist, genre, track, album, etc.)<br>Visual data, such as any text, images and video data, including Internet data, picture data, podcast data and playlist data<br>Network interaction data, such as click patterns and channel viewing patterns |
| Relationship data | User identifying information, such as name, age, gender, race, and social security number<br>Social network data |
| Transactional data | Vendors<br>Financial accounts, such as credit cards and banks data<br>Type of merchandise/services purchased<br>Cost of purchases<br>Inventory of purchases |
| Device interaction data | Any data not captured above dealing with user interaction of the device, such as patterns of use of the device, applications utilized, and so forth |

Context Based Query Augmentation

One of the most popular information services used on the Internet are knowledge search services such as Yahoo! Answers. Such services allow users to post questions and receive answers from a broad base of other users, some of whom may be subject matter experts, some of whom may have had similar life experiences and some of whom have an interest in the subject matter of the question. Over time, a wide array of questions and answers are accumulated and together form a knowledge base that can be indexed and searched. Searching such knowledge bases can carry significant advantages over searching the web for content matching keywords, since oftentimes such as search can provide precise and targeted answers to specific questions.

The potential value of such a knowledge base grows with every question posed and answer given, but the difficulty in using the knowledge base grows as well. A user may have difficulty translating a general question into a form that yields a manageable set of questions and answers. There simply be too many questions and answers to browse manually. A keyword search of a knowledge base may yield no answers at all or answers that are marginally relevant to the user.

Users of knowledge search services commonly ask questions that relate, in one way or another, to their current context. A user's context can be broadly defined as the total set of circumstances that surround a user at any point in time. A user's context includes the user's current location, the date and the time, but can also include any other spatial, temporal, social and topical data that define who the user is and where the user has been, where the user is going, with whom are they going for what purpose and what is the user interested in.

For example, a user might ask, "where's a good place to eat?" Obviously, any answers referring to restaurants that are not reasonably close to the user are not useful. Thus, if the user is currently in Santa Fe, the question is actually "where's a good place to eat in Santa Fe?" But the user might have food preferences, for example, the user might like sushi or Thai, so the question is actually "where's a good sushi or Thai restaurant in Santa Fe?" At an even more abstract level, if its past 12:00 PM, and a user hasn't had lunch, it might be obvious that the next question is "where's lunch?", unless, of course, the user always skips lunch. Users may also prefer to hear the opinion of people who are similar to them, e.g. same age, same profession, and so forth.

A W4 COMN, or a similar network that tracks Who, What, When and Where data can mine data accumulated about users to enhance searching a knowledge base, or any other kind of database that contains information about people, places, things, events or topic to augment questions posed by a user. Furthermore, over time, questions asked by specific users in specific contexts can be archived and used to form predictive models that can be used to predict questions that a user having specific attributes is likely to ask in specific situations.

For example, suppose a user has been on a long-distance train ride, has been stationary in his or her seat for 2.5 hours and has used a credit card to buy four beers during that time from the train's mobile snack vendor. As the user exits the train, the user pulls out a PDA to make a query, and the device automatically pops up a map of the station with the nearest bathrooms already indicated on the map. The user might select a "not this" button and the next likely answer is displayed, e.g. the currency exchanges and/or checked baggage claim and or taxi stands. Each individual might receive a differently constituted or ranked set of most likely answers to their current situation, e.g. if a user's path history shows that the user never uses train station bathrooms, it might display taxis or the nearest hotel or fast food bathroom depending on my individual data history and profile. In another automatic embodiment, perhaps sponsored by an advertiser, a user who has a history of buying souvenirs at concerts would have his device display the location of memorabilia vendors at the venue.

Figure 7:
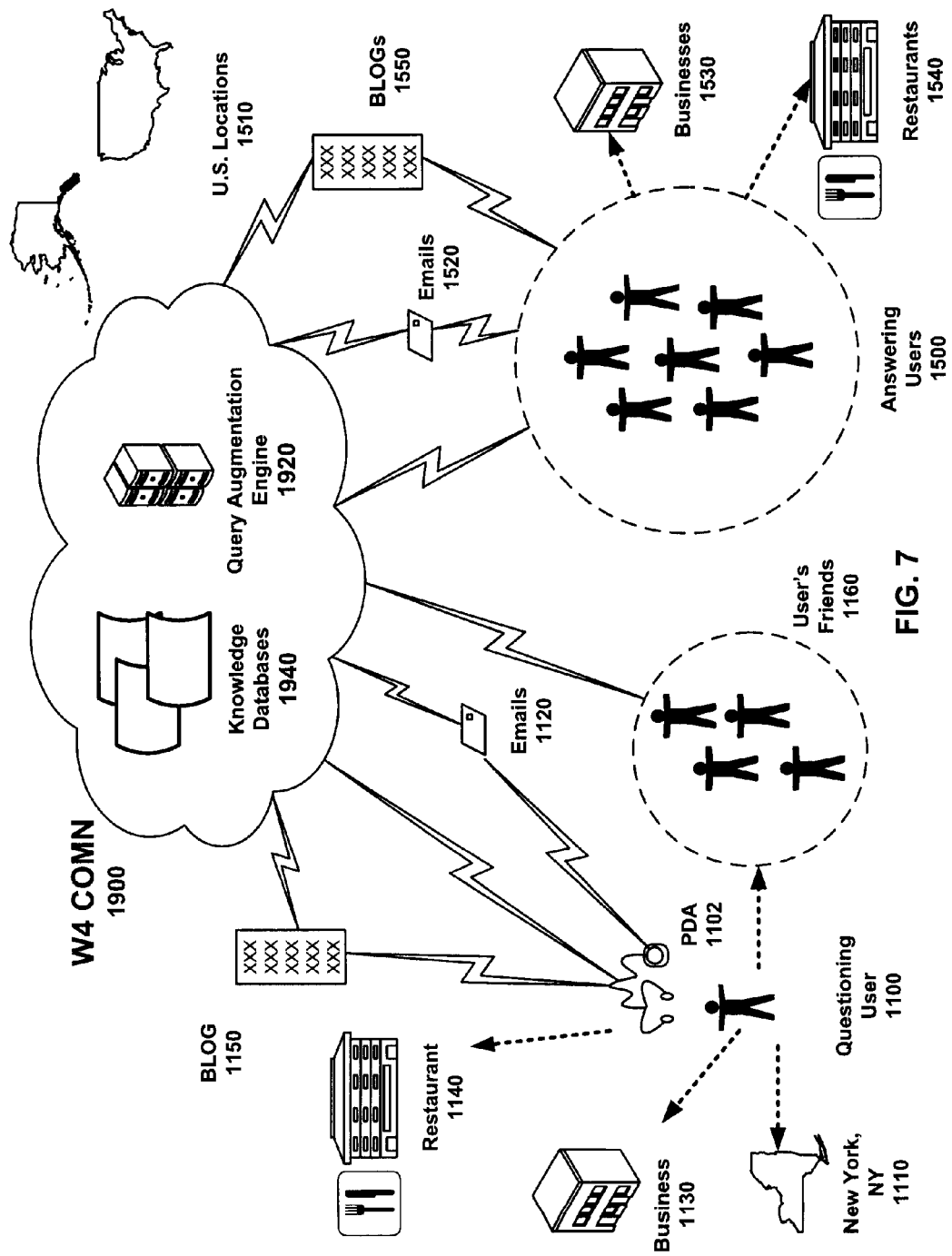
FIG. 7 illustrates one embodiment of a how a W4 COMN can provide context enhanced knowledge search services.

FIG. 7 illustrates one embodiment of a how a W4 COMN can provide context enhanced knowledge search services.

The W4 COMN 1900 maintains one or more knowledge databases 1940 that contains questions posed by questioning users 1100 and answers given by answering users 1500 (i.e. a Q&A database.) Access to the knowledge database 1940 is provided by a query augmentation engine 1920. A questioning user 1100 can submit a question to the query augmentation engine 1920 through a proxy device, such as a PDA 1102 and receive one or more answers to the question through the proxy device.

The questioning user 1110 is currently located in New York City, is a customer of a business 1130 and is currently dining at a restaurant 1140. The questioning user 1100 additionally maintains a BLOG 1150, has an email account 1120 and has a group of friends. All of these entities and data objects, as well as their association to the questioning user 1100, are known to the W4 COMN 1900 and help define the user's current context. The user's current context can be broadly defined as the total set of social, topical, temporal and spatial information that locates the user in space and time and identifies the user's interests, activities and social associations.

Each answer in the Q&A database 1940 is provided by an answering user 1500. Each answering user 1500 has his or her own context as well. For example, each of the answering users 1500 is located somewhere in the U.S. 1510, is a customer of one or more businesses 1530, dines at one or more restaurants 1540, has at least one email account 1520, and maintains at least one BLOG 1550. All of these entities and data objects, as well as their association to the answering users 1500, are known to the W4 COMN 1900 and help define the answering users' current contexts.

The query augmentation engine 1920 can mine the social, topical, temporal and spatial information relating to a questioning user's current context to supplement questions asked by the user. Thus, for example, if the questioning user 1100 asks "where should I eat?", the query augmentation engine 1920 could determine that it is lunchtime, that the user is in New York City 1110 and that the user has dined frequently at a sushi restaurant 1140, and thus compose a more specific question "where is a sushi restaurant in New York City that is open for lunch?"

The query augmentation engine 1920 can additionally mine the social, topical, temporal and spatial information relating to answering users' current contexts to help refine the set of answers returned to the question. For example, in response to the question "where is a sushi restaurant in New York City that is open for lunch?", the query augmentation engine 1920 could preferentially select answers given by the questioning user's friends 1160, could preferentially select answers by users who are residents of New York City, who are demographically similar to the questioning user (e.g. same age, income level, same interests), and so forth.

The W4 COMN 1900 can additionally store historical context information relating to each question and answer. For example, the questioning user 1110 might live most of the year in Hawaii, but is on vacation in New York City when the question "where should I eat?" is asked. The historical context for the question will contain a specific spatial location, New York City. An answering user 1500 may now be in a high income bracket, but may have been at a low income level when he or she answered the question. The historical context for the question will contain a specific demographic, low income level.

Over time, the Q&A databases 1940 can accumulate a large repository of questions and answers relating to a wide array of contexts. The query augmentation engine 1920 can tap into this information to suggest questions even when none are asked. For example, if users on vacation in New York City who like sushi frequently ask the question "where should I eat?" around 12:00 PM, the query augmentation engine 1920 can detect when a user is in such a context and suggest such a question spontaneously to the user.

Figure 8:
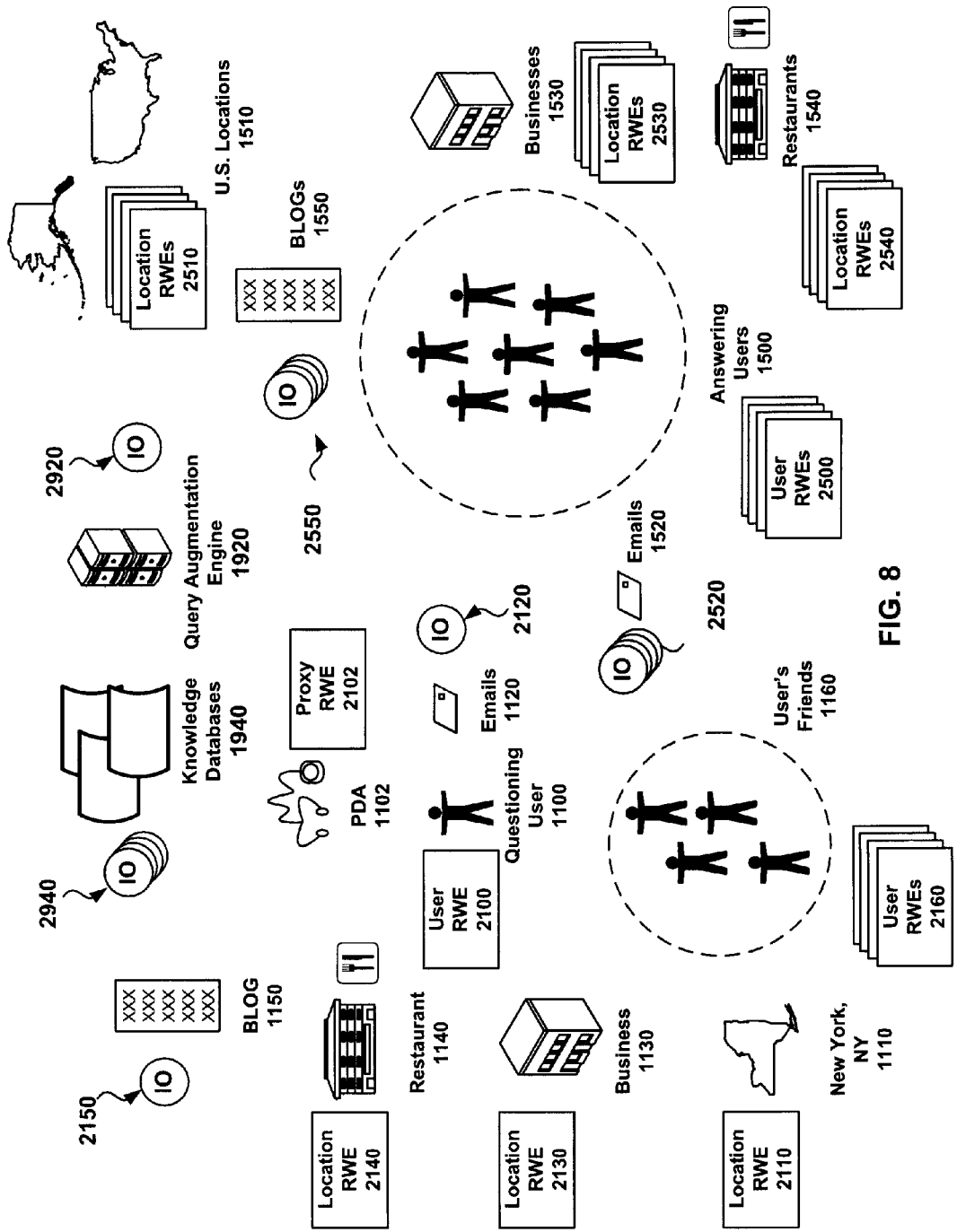
FIG. 8 illustrates one embodiment of how the users, devices and associated data objects shown in FIG. 7 can be defined to a W4 COMN.

FIG. 8 illustrates one embodiment of how the users, devices and associated data objects shown in FIG. 7 can be defined to a W4 COMN.

Figure 9:
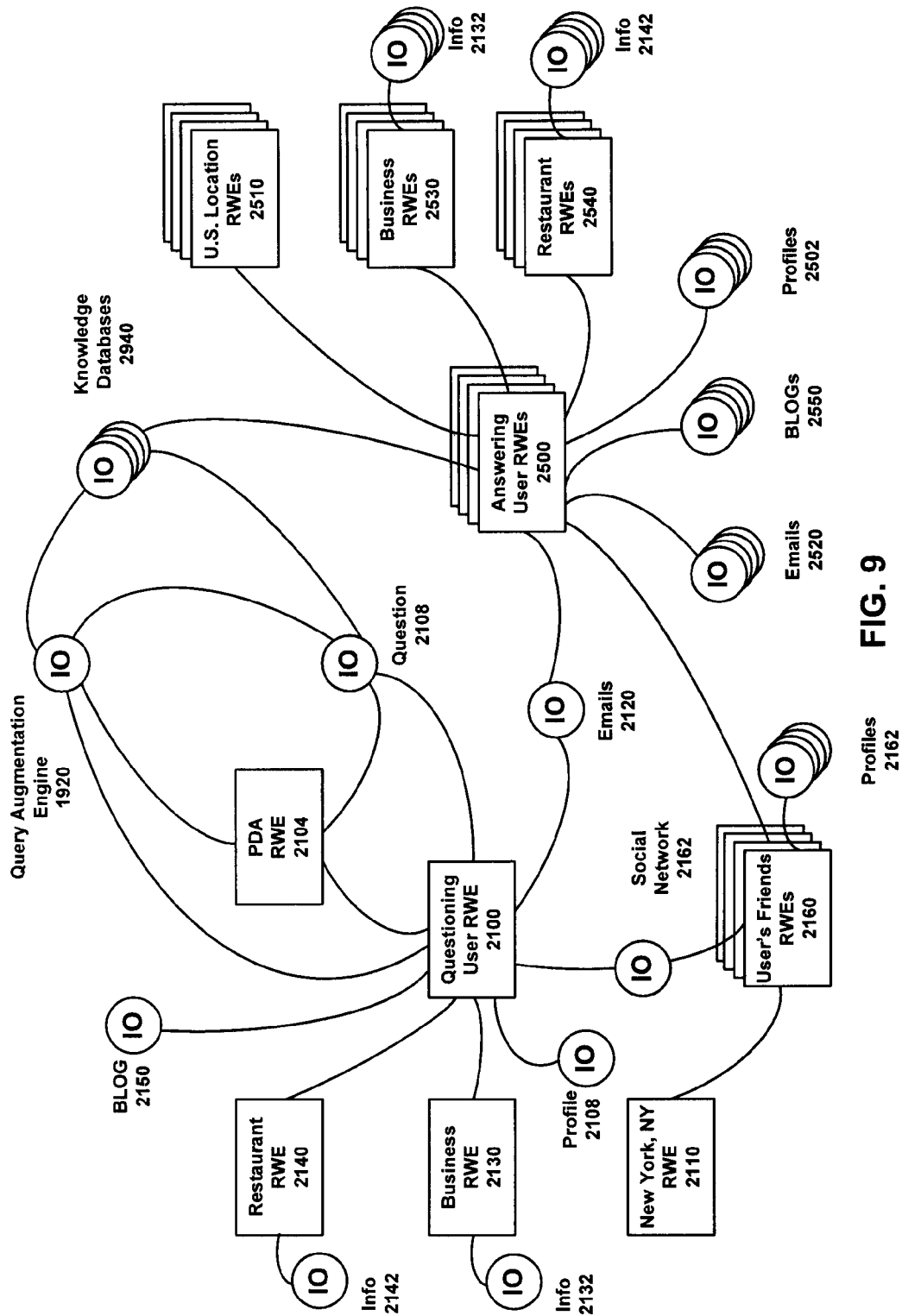
FIG. 9 illustrates one embodiment of a data model showing how the RWEs and IOs shown in FIG. 8 can be related a users question within a W4 COMN.

Users 1110 and 1500 are represented as user RWEs, 2110 and 2500 respectively. The questioning user's PDA 1102 is represented as a proxy RWE 2102. Businesses 1130 and 1150 are represented as location RWEs 2130 and 2150 respectively. Restaurants 1140 and 1540 are represented as a location RWEs 2140 and 2540 respectively. New York City and other U.S. locations 1110 and 1510 are represented as a location RWEs 2110 and 2510 respectively. User emails 1120 and 1520 are represented as passive data IOs 2120 and 2520 respectively. User BLOGS 1150 and 1550 are represented as passive data IOs 2150 and 2550 respectively. The query augmentation engine 1920 and the knowledge databases 1940 are represented as active IOs 2920 and 2940 respectively FIG. 9 illustrates one embodiment of a data model showing how the RWEs and IOs shown in FIG. 8 can be related a users question within a W4 COMN.

In one embodiment, the submission of a question by a questioning user using a proxy device creates a passive question IO 2108 associated with the questioning user RWE 2100, the user's PDA proxy RWE 2104 and the query augmentation engine IO 2920. The questioning user RWE 2100 is directly associated with a user profile IO 2108. In one embodiment, the user profile IO 2108 is a consolidated profile that relates the user to all personal and demographic data available to the network relating to the user.

The questioning user RWE 2100 is currently associated with a location RWE for New York City because the user is physically present in New York City. The network may have detected the user's current location through, for example, the user's PDA using an embedded GPS device or by triangulation of cellular signals broadcast by the device. The questioning user RWE 2100 is further directly associated with an RWE for a business 2130 that the user patronizes, which itself has at least one IO 2132 containing information about the business such as the type of the business, ownership information and hours of operation. The questioning user RWE 2100 is further directly associated with an RWE for a restaurant 2140 that the user patronizes, which itself has at least one IO 2142 containing information about the business such as menus, reviews and hours of operation.

The questioning user RWE 2100 is further directly associated with IOs for emails 2120 sent and received by the questioning user and a BLOG 2150 maintained by the user. The questioning user RWE 2100 indirectly associated with a group of user RWEs 2160 representing the user's friends though a social network IO 2162, which could be a passive data IO, such as a contact list, or could be an active IO, such as a social networking website provided by a third party provider. Each of the user RWEs 2160 has at least one profile IO containing, for example, demographic information about each user.

The data relationships in the illustrated embodiment discussed above are exemplary, and do not exhaust the myriad number of entities and IOs that can be directly or indirectly related to the questioning user RWE 2100. The questioning user RWE 2100 can be indirectly related to a large, and potentially unbounded set of entities and data known to the network through various data relationships and at varying degrees of separation. For example, the user's friends 2160 each may patronize different businesses and restaurants, maintain their own BLOGs, be in a different physical location at any point in time, and so forth. The total set of RWEs and IOs directly or indirectly related to the questioning user RWE 2100 provide a detailed picture of the user's current and historical contexts that can be used to augment questions posed by a user within that context.

Similarly, each answering user RWE 2500 is associated, directly or indirectly, with a potentially unbounded set of RWEs and IOs through a network of data relationships. In the illustrated embodiment, each answering user RWE 2500 is directly associated with RWEs for businesses and restaurants 2530 and 2540 patronized by the users and RWEs representing the current location 2510 of the users. Each answering user RWE 2500 is further directly associated with IOs representing user emails 2520, user BLOGs 2550 and user profiles 2502. The RWEs for businesses and restaurants 2530 and 2540 each are associated with IOs 2532 and 2542 for information relating to the business and restaurant respectively. The total set of RWEs and IOs directly or indirectly related to the answering user RWEs 2500 provide a detailed picture of the answering user's current and historical contexts that can be used to select users whose answers are most likely to be helpful or of interest to the questioning user.

There can also be relationships between a questioning user RWE and answering user RWEs. Such relationships may arise through similar interests, common friends, common physical locations, common online browsing, community or communications and so forth. In the illustrated embodiment, at least one of the RWEs 2160 for the questioning user's friends is an answering user RWE 2500 and at least one of the questioning users emails 2120 is associated with an answering user RWE, for example, because the email is directed to, or refers to, the answering user the RWE relates to.

In one embodiment, within a W4 COMN, the relationships shown in FIG. 9 are built and maintained by one or more correlation engines within a W4 engine which services the W4 COMN. The creation of such relationships may be automatic and part of the normal operation of the W4 COMN. Alternatively, such relationships can be created on demand.

In one embodiment, questions 2108 that are being posted for the first time are inserted into the knowledge database 2940 and can be responded to by answering users. In one embodiment, every question inserted into the knowledge database 2940 is associated with the context of the questioning user at the time the question was posed. In one embodiment, questions in the knowledge database 2940 which have been asked multiple times by various users are associated with the contexts of all, or substantially all, of the questioning users at the time the question was posed. In one embodiment, every answer inserted into the knowledge database 2940 is associated with the context of the answering user at the time the answer was given.

In one embodiment, the query augmentation engine 2920 can automatically create a question IO 2108 by examining the current context of a user RWE 2100 and matching the user's context to contexts for questions stored in the knowledge database 2940. The IO 2108 can then be sent to the user's proxy device 2104 as a suggested question.

Figure 10:
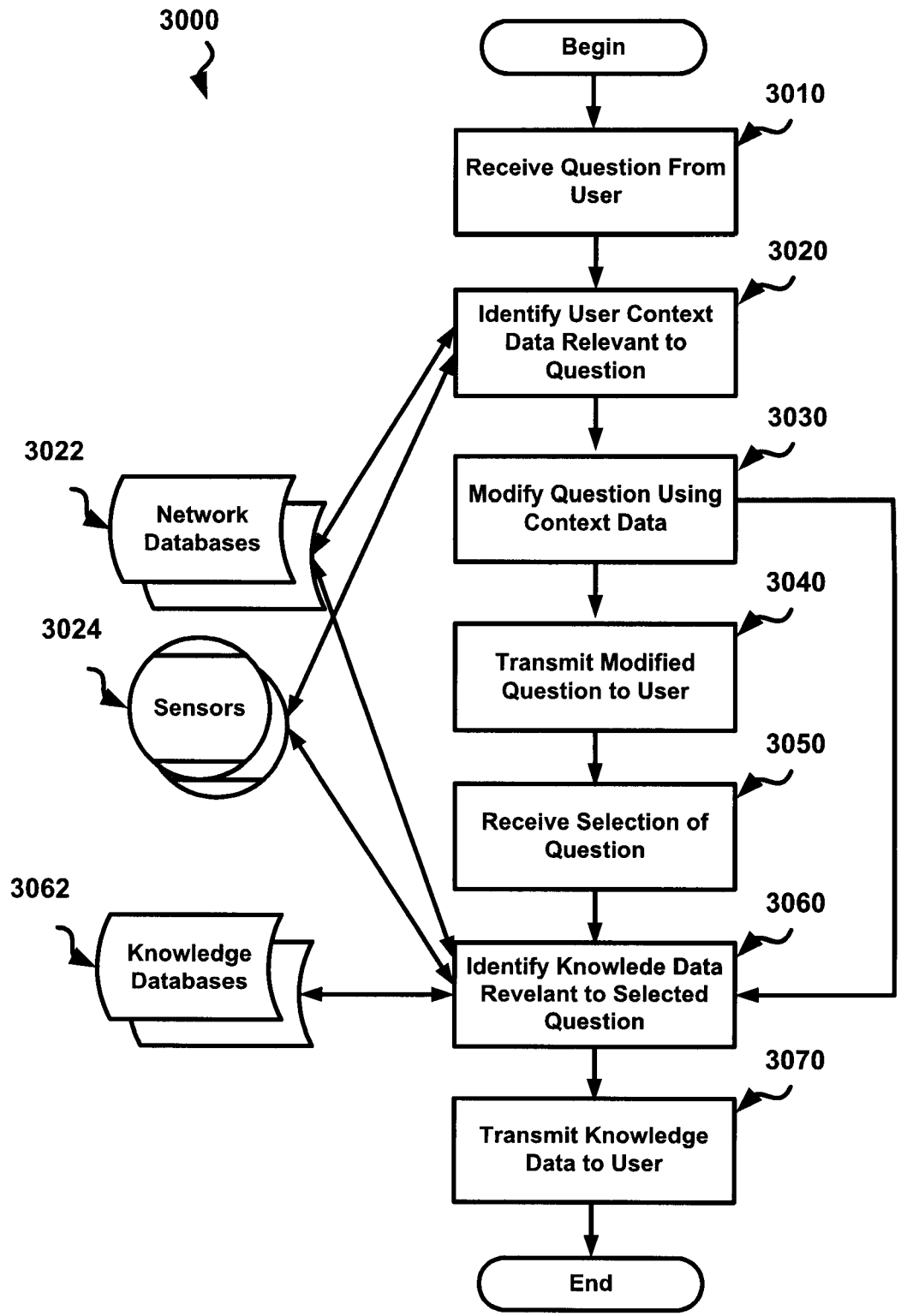
FIG. 10 illustrates one embodiment of a process of how a network, for example, a W4 COMN, can use temporal, spatial, and social data relating to a user to provide augmented queries for a knowledge system.

FIG. 10 illustrates one embodiment of a process 3000 of how a network, for example, a W4 COMN, can use temporal, spatial, and social data relating to a user to provide augmented queries for a knowledge system.

A question is received 3010, over a network, from a questioning user relating to any topic of interest to the user. The question comprises, at a minimum, an identification of a user and at least one question criteria. The identification of a user can be, without limitation, a name, a login, an email address, a certified introduction from a trusted source or any other token or set of tokens that uniquely identifies a user within the network. The identification could comprise a user ID on a social networking website. In one embodiment, the identification of a user refers to the questioning user. In one embodiment, the identification of the user can refer to a second user (i.e. other than the questioning user.)

Question criteria can, without limitation, comprise any spatial, temporal, topical or social criteria relating to real world entities and topics of interest. In one embodiment, the criteria can be related to one another using standard relational or set operators. In one embodiment, the question can be stated as a natural language query. In one embodiment, the question can be stated as a media object such as a photo or video or audio clip. In one embodiment, query criteria are tokens formed with standard characters such as words or symbols.

In one embodiment, query criteria can include data objects. For example, a user could enter the query such as "what is this?<image>", "show me more like this<image>", or "who wrote the lyrics to this?<media>" where <image> and <media> represent actual image and media data objects the user attaches to the question. In one embodiment, questioning user can submit an image or video clip in real-time, for example, of a co-located building or object. The process can then automatically format a question to gather a set of similar multimedia content labeled with the name, function, known information related to the building/object.

The identification of a user and the question criteria are then 3020 used to formulate a first query so as to search, via the network, for user profile data, social network data, spatial data, temporal data and topical data that is available via the network (including network databases 3022 and sensors 3024) that relates to the question criteria and the identified user so as to identify user context data relevant to question criteria. In formulating the query, if a data object is included in among the question criteria, the data object can be processed to help further define the object by, without limitation, extracting keywords from the object content, extracting metadata from the object, classifying the object using an image classifier, deriving a checksum, or deriving a signature from the object.

The user context data is then used, via processing capabilities available to the network, to add additional criteria to the original question 3030 to create a modified question qualified with user context data. The additional criteria can be any kind of spatial, temporal, social or topical criteria that qualify, personalize and refine the original question so as to form a more specific and targeted question. In one embodiment, the original question criteria and the additional question criteria are formed into multiple questions that can range in specificity or relate to alternative topics.

Optionally, the modified question or questions can be transmitted to the user 3040, via the network, so as to allow the user to select specific modified questions for further processing. After the user completes his or her selection, the user's selection is received over the network 3050 and only selected questions are processed.

The identification of a user and modified question criteria are then used to formulate a second query 3060 so as to search, via the network, for knowledge data, user profile data, social network data, spatial data, temporal data and topical data available to the network (including network databases 3022 and sensors 3024 and knowledge databases 3062) that relates to the modified question criteria and the identified user so as to identify knowledge data relevant to the identified user and the modified question criteria. The identified knowledge data retrieved by the second query can be an exact match to the modified question criteria, or can be a close fit. For example, the question "where's a good sushi or Thai restaurant in Santa Fe?" could retrieve a related question "where's a good seafood restaurant in Santa Fe?" or "where's a good Japanese restaurant in the Santa Fe area?"

In one embodiment, knowledge data comprises questions and answers entered by a plurality of users. In one embodiment, the knowledge data additionally comprises an identification of each of the plurality of users who entered the questions and answers. In one embodiment, the knowledge data additionally comprises spatial, temporal, social and topical data that related to each of the plurality of users who entered the questions and answers at the time such questions and answers were entered (that is to say, the context of the users at the time the questions and answers were entered.)

In one embodiment, the knowledge data for each question and answer additionally comprises an identification of at least one of a plurality of users who have consumed the knowledge data (e.g. any users who have viewed the knowledge data.) In one embodiment, the knowledge data additionally comprises spatial, temporal, social and topical data that related to each of the plurality of users who consumed the knowledge data at the time the data was consumed (e.g., the context of the users viewing the knowledge data at the time the knowledge data was viewed.)

In one embodiment, the knowledge data additionally comprises a selection of a best answer, wherein the user who originally entered the question has selected a best answer from among the answers posted. In one embodiment, the knowledge data for at least some questions and answers additionally comprises consumption popularity data (e.g., the number of times a question or answer was selected or viewed.) In one embodiment, the knowledge data for at least some questions and answers additionally comprises annotations which, in one embodiment, can be entered by any user of the system. In one embodiment, the knowledge data for at least some answers additionally comprises ratings of the answer's usefulness by users, which can be entered by the questioning user or by consuming users.

In one embodiment, the identified knowledge data is ranked based on the closeness of fit between the modified question criteria and the identified knowledge data. In one embodiment, the identified knowledge data is ranked based on the closeness of fit between the context of the identified user and the current or historical context of the users who entered the knowledge data relating to the user's questions. In another embodiment, the identified knowledge data can be ranked based on the closeness of fit between the context of the identified user and the current or historical context of the users who discovered, browsed or interacted with the knowledge data relating to the user's questions, e.g. as search results to a similar or identical query or context. The selected knowledge data is then transmitted 3070 to the end user. Data transmitted to questioning users can be formatted in any electronic format suitable for consumption or display by a user device such as, for example, HTML or XML documents.

In one embodiment, if no knowledge data is a close fit to the modified question, the modified question, the original question or both are posted to the knowledge databases 3062 such that other users can view the questions and post answers.

Figure 11:
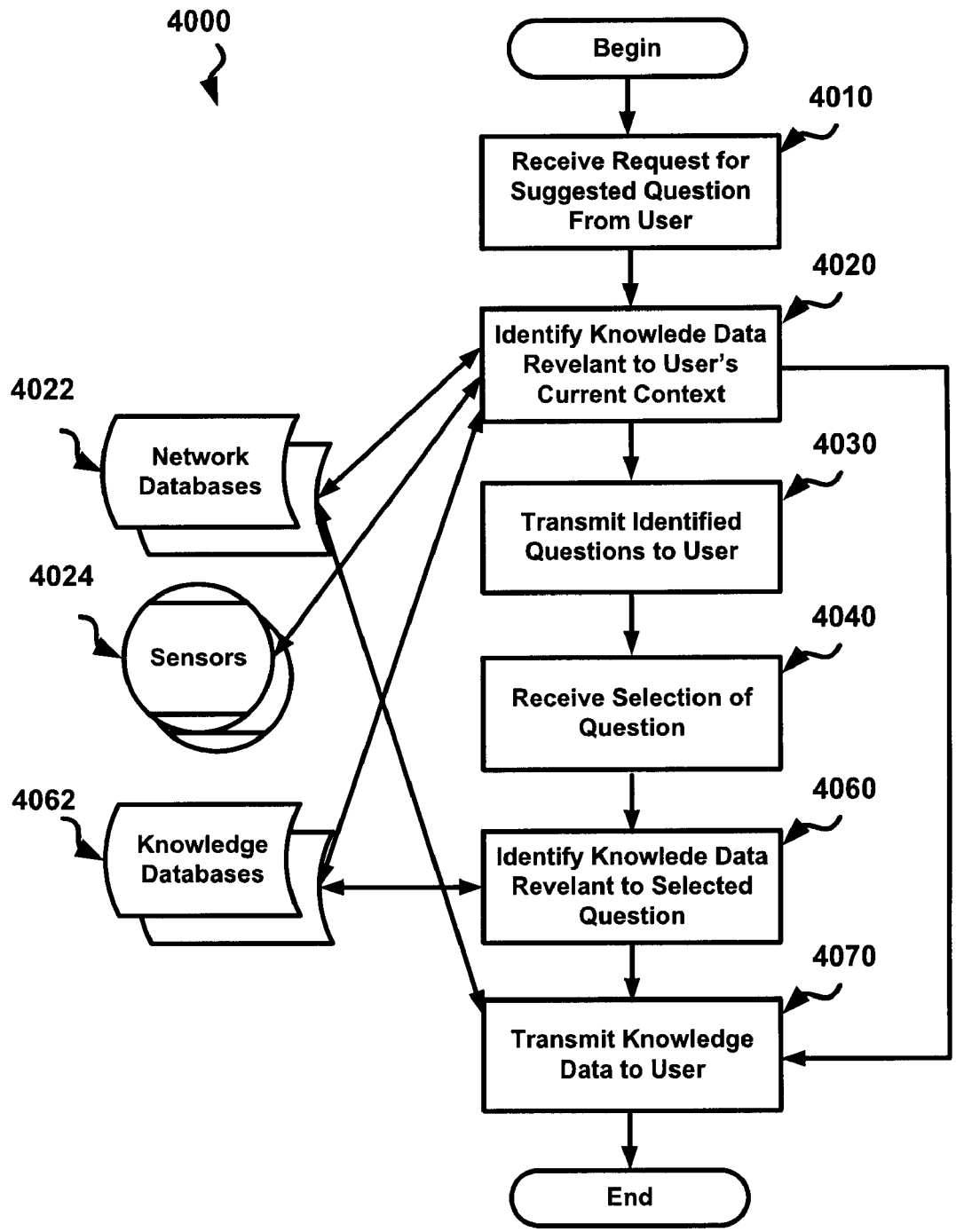
FIG. 11 illustrates one embodiment of a process of how a network, for example, a W4 COMN, can use temporal, spatial, and social data relating to a user to provide automatically generated context sensitive queries.

FIG. 11 illustrates one embodiment of a process 4000 of how a network, for example, a W4 COMN, can use temporal, spatial, and social data relating to a user to provide automatically generated context sensitive queries.

As part of the normal operation of a W4 COMN, the current context of users is constantly updated. Spatial, temporal, topical and social data is tracked, correlated and indexed for individual users from a panoply of sources. The W4 COMN can, if a user carries a geo-locatable proxy device, track the user's location in real time. The W4 COMN can infer activities that a user engages in by extracting interaction data from a variety of sources such as emails, text messages and so forth. The W4 COMN can also be aware of a person's preferences, aversions, hobbies, social circle and so forth. Every instant, a user's context, the Who, What, When and Where surrounding a user can change.

Over time, knowledge database is accumulated, users in various contexts will tend to ask similar, or identical questions. The knowledge database can be made context aware by storing the context of the user asking a question at the time the question was asked. Where a question is frequently repeated in a particular context, on an empirical basis, it can be inferred that such a question has particular relevance to users in such a context. Thus, the knowledge database not only accumulates the knowledge of the users using the database, but also effectively indexes questions by context, enabling the system to suggest questions where none are asked.

The process begins when a request for a suggested question or questions is received 4010 over a network from or on behalf of a requesting user. The request could be triggered by a user-initiated event, such as a user taking a user interface action on a proxy device or when a user speaks a keyword or key phrase into a cell phone or PDA. The request could be automatically triggered on behalf of the user by a process within the W4 COMN on a periodic basis, such as every hour. The request could also be automatically triggered on behalf of the user by the W4 COMN or a W4 COMN application based upon sensor or data values on the proxy device beyond a specific threshold so as to initiate a question without user involvement. For example, a proxy device may sense quick de-acceleration over a small distance followed by an impact, and derive that the user has been in some kind of accident, thus triggering a knowledge data request and response.

More generally, a process within the W4 COMN could track multiple spatial, temporal, topical or social variables in a user's current context and trigger a request for a suggested question when any such variables change. For example, the process could trigger a request for a suggested question when a user physically enters a new town, a new city or a new neighborhood, when a user downloads and listens to a new song, when a user sends an email or a text message or when a user meets a friend by chance on the street.

In another example, the trigger event can be a change in the state of a sensor associated with the requesting user. The sensor can be associated with the user's proxy device (e.g. the temperature goes up drastically, so a suggested question might be "what to do in a fire" comes up or accelerometer stops quickly, so "what to do in a crash" comes up, etc.) The sensor could be a network sensor located in proximity to the user (e.g. a traffic or weather sensor.

The request comprises, at a minimum, an identification of a user. The identification of a user can be, without limitation, a name, a login an email address, a certified introduction from a trusted source or any other token or set of tokens that uniquely identifies a user within the network. The identification could comprise a user ID on a social networking website. In one embodiment, the identification of a user refers to the requesting user. In one embodiment, the identification of the user can refer to a second user (i.e. other than the requesting user) who is relevant to the query, e.g. co-located with the requesting user or a preferred filtering source for the requesting user on this subject matter.

In the next step of the process a first query is formulated 4020 so as to search, via the network, for knowledge data, user profile data, social network data, spatial data, temporal data and topical data available to the network (including network databases 3022 and sensors 3024 and knowledge databases 3062) that relates to the identified user so as to identify knowledge data relevant to the identified user's current context. In one embodiment, the identified knowledge data comprises a set of questions and answers entered by a plurality of users which can be transmitted 4070 directly to the user without further processing. In one embodiment, the process identifies the best match question and answer pair and further identifies closely related questions.

In one embodiment the process only identifies questions relevant to the identified user's current context. The identified questions can be transmitted to the requesting user 4030, via the network, so as to allow the requesting user to select specific questions for further processing. After the user completes his or her selections, the user's selection is received over the network 4040 and only selected questions are processed. If the first query did not retrieve answers to the selected questions, the selected questions are used to formulate a second query 4060 so as to search, via the network, for knowledge data, user profile data, social network data, spatial data, temporal data and topical data available to the network that relates to the selected question criteria and the user so as to identify knowledge data relevant to the user and the selected questions.

In one embodiment, the identified knowledge data is ranked based on the closeness of fit between the context of the identified user and the current or historical context of the users who entered the knowledge data relating to the user's questions. The selected knowledge data is then transmitted 4060 to the requesting user. Data transmitted to requesting users can be formatted in any electronic format suitable for consumption or display by a user device such as, for example, HTML or XML documents. In one embodiment, knowledge data returned to a requesting user is filtered using user preferences. For example, a user may choose to filter adult or unwanted topics/subjects, sources, users or any other combination of spatial, temporal, social or topical criteria.

In one embodiment, when a suggested question is selected by a user, the knowledge database is updated to reflect the fact the question has been selected by the user. In one embodiment, the number of times a question has been selected is stored on the knowledge database. In one embodiment, the context of every user that has selected the question is recorded on the knowledge database. In one embodiment, selection count data can be used to rank the identified knowledge data transmitted to the end user. In one embodiment, the identified knowledge data is ranked based on the closeness of fit between the context of the identified user and the current or historical context of the users who have selected the question in the past.

Figure 12:
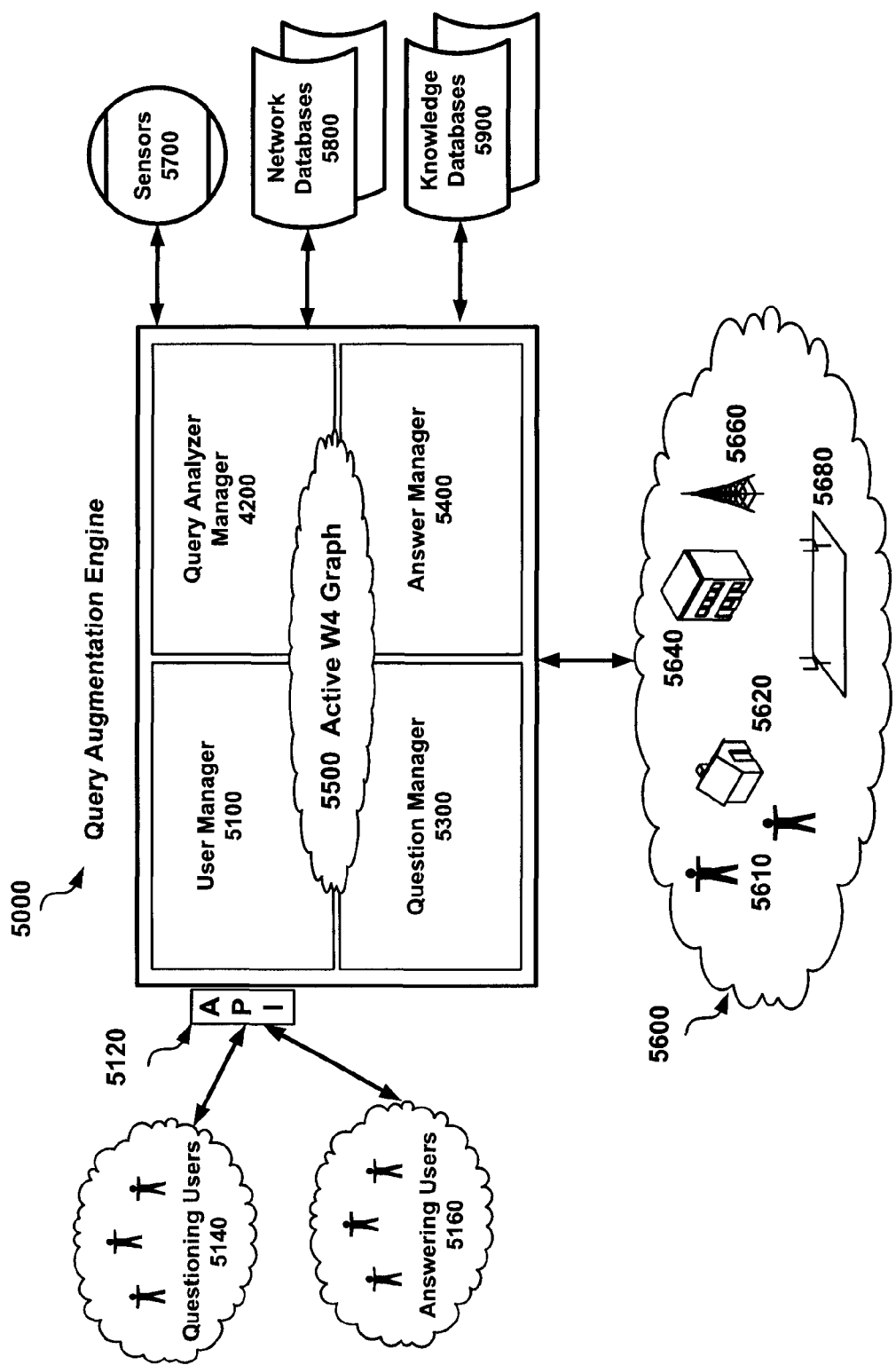
FIG. 12 illustrates one embodiment of an Query Augmentation Engine capable of supporting processes such as that illustrated in FIG. 10 and FIG. 11 that provides query augmentation and automatically generated context sensitive queries within a network, such as a W4 COMN, having temporal, spatial, and social data relating to a users.

FIG. 12 illustrates one embodiment of an Query Augmentation Engine 5000 capable of supporting processes such as that illustrated in FIG. 10 and FIG. 11 that provides query augmentation and automatically generated context sensitive queries within a network, such as a W4 COMN, having temporal, spatial, and social data relating to a users.

The Query Augmentation Engine 5000 comprises four managers, a User Manager 5100, a Query Analyzer Manager 5200, a Question Manager 5300 and an Answer Manager 5400. In one embodiment, the Query Augmentation Engine 5000 is a component of a W4 COMN. In another embodiment, the Query Augmentation Engine 5000 resides on one or more servers and is connected to a network that has access to spatial, social, temporal and topical data relating to a plurality of users. In one embodiment, each of the managers 5100, 5200, 5300 and 5400 are comprised of one or more modules, some of which can be shared between one or more managers. One or more of such modules may be components of other engines within a W4 COMN.

The Query Augmentation Engine 5000 is accessible, via the W4 COMN, to users entering questions 5140 and answering questions 5160. The users 5140 and 5160 are shown inside of clouds indicating that each user asks or answers questions from within a cloud of spatial, temporal, topical and social data associations—the user's current context. Knowledge data is stored in one or more knowledge databases 5900 accessible via the network.

In one embodiment, the W4 COMN continuously gathers spatial, temporal, social and topical data relating to entities known to the network 5600, which can include persons 5610, locations 5620, businesses 5640, sensors 5660, and events 5680. In one embodiment, using spatial, temporal, social and topical data available about a specific user, topic or logical data object every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN. In one embodiment, W4 data and the global index are stored on one or more databases accessible to the network 5800.

The User Manager 5100 provides facilities that allow end users to access the services of the Query Augmentation Engine 5000. The User Manager 5100 is configured to receive questions from questioning users 5140, over a network, relating to any topic of interest to the users. The questions each comprise, at a minimum, an identification of a user and at least one question criteria. The identification of a user can be, without limitation, a name, a login an email address, a certified introduction from a trusted source or any other token or set of tokens that uniquely identifies a user within the network. The identification could comprise a user ID on a social networking website. In one embodiment, the identification of a user refers to the questioning user. In one embodiment, the identification of the user can refer to a second user (i.e. other than the questioning user.)

Question criteria can, without limitation, comprise any spatial, temporal, topical or social criteria relating to real world entities and topics of interest. In one embodiment, In one embodiment, the criteria can be related to one another using standard relational or set operators. In one embodiment, the question can be stated as a natural language query. In one embodiment, the question can be stated as a media object such as a photo or video or audio clip. In one embodiment, query criteria are tokens formed with standard characters such as words or symbols.

In one embodiment, query criteria can include data objects. For example, a user could enter the query such as "what is this?<image>", "where can I find one of these?<image>", or "who wrote the lyrics to this?<media>" where <image> and <media> represent actual image and media data objects the user attaches to the question. In one embodiment, the User Manager is configured to allow questioning users to submit images or video clips in real-time of a co-located building or object. The User Manager can then automatically format a question to return to the user a set of similar multimedia content labeled with the name, function, known information related to the building/object.

The User Manager 5100 is additionally configured to receive requests for suggested questions. The request comprises, at a minimum, an identification of a user. The identification of a user can be, without limitation, a name, a login an email address, a certified introduction from a trusted source or any other token or set of tokens that uniquely identifies a user within the network. The identification could comprise a user ID on a social networking website. In one embodiment, the identification of a user refers to the requesting user. In one embodiment, the identification of the user can refer to a second user (i.e. other than the requesting user.)

In one embodiment, requests for suggested questions are triggered by a user-initiated event, such as a user taking a user interface action on a proxy device or when a user speaks a keyword or key phrase into an cell phone or PDA. In one embodiment, the User Manager 5100 can automatically trigger a suggested question on behalf of the user on a periodic basis, such as every hour. In one embodiment, the User Manager tracks multiple spatial, temporal, topical or social variables in a user's current context and triggers a request for a suggested question when any such variables change. In one embodiment, the change in the requesting user's current context data can be change in the state of a sensor associated with the requesting user. In one embodiment, the change in the requesting user's current context data can be change in the user's physical location (detected, for example, through a geo-locatable proxy device.)

The User Manager 5100 is additionally configured to transmit questions modified by the Query Analyzer Manager 5200 or identified by the Question Manager 5300 (described in more detail below) back to questioning users and to receive selections of questions from questioning users. The User Manager 5100 is additionally configured to transmit knowledge data identified by the Question Manager 5300 in response to user questions back to the questioning users 5140. Data transmitted to questioning users 5140 can be formatted in any electronic format suitable for consumption or display by a user device such as, for example, HTML or XML documents. In one embodiment, data is transmitted to questioning users 5140 via an API.

The User Manager 5100 is additionally configured to receive answers to posted questions from answering users 5160. The User Manager 5100 can provide an interface to allow answering users 5160 to browse questions posted by questioning users 5140. In one embodiment, answers can include data objects, such as media objects, text objects, formatted documents and so forth. In one embodiment, the User Manager 5100 provides an API that allows third party applications on user proxy devices to display questions and post answers to questions.

The Query Analyzer Manager 5200 provides facilities to analyze and augment user questions received by the User Manager 5100. In one embodiment, for each question received by the User Manager 5100, the Query Analyzer Manager 5200 uses the identification of users and question criteria to a formulate queries so as to search, via the network, for user profile data, social network data, spatial data, temporal data and topical data that is available via the network (including network databases 5800 and sensors 5700) and relates to the question criteria and the identified user so as to identify user context data relevant to question criteria. If a data object is included in the question criteria, the Query Analyzer Manager 5200 can process the data object to help further define the object by, without limitation, extracting keywords from the object content, extracting metadata from the object, classifying the object using an image classifier, deriving a checksum, or deriving a signature from the object.

In one embodiment, the Query Analyzer Manager 5200 is further configured, to use user context data to add additional criteria to questions to create modified questions qualified with user context data. The additional criteria can be any kind of spatial, temporal, social or topical criteria that qualify, personalize and refine the original question so as to form a more specific and targeted question. In one embodiment, the original question criteria and the additional question criteria can formed into multiple questions that can range in specificity or relate to alternative topics.

The Question Manager 5300 provides facilities that allow users to access and knowledge data stored in the knowledge databases 5800. In one embodiment, the Question Manager 5300 can receive modified questions from the Query Analyzer Manager 5200. In one embodiment, the Question Manager 5300 can receive unmodified questions from the User Manager 5100. In one embodiment, the Question Manager 5300 can receive selected questions from the User Manager 5100.

In one embodiment, the Question Manager 5300 uses the identification of users and question criteria to formulate queries so as to search, via the network, for knowledge data, user profile data, social network data, spatial data, temporal data and topical data that is available via the network (including network databases 5800, sensors 5700, and knowledge databases) and relates to the question criteria and the identified users so as to identify knowledge data relevant to the user and question criteria. In one embodiment, identified knowledge data is passed to the User Manager 5100 for transmission back to questioning users 5140. The identified knowledge data retrieved by the queries can be an exact match to the question criteria, or can be a close fit.

In one embodiment, knowledge data comprises questions and answers entered by a plurality of users. In one embodiment, the knowledge data additionally comprises an identification of each of the plurality of users who entered the questions and answers. In one embodiment, the knowledge data additionally comprises spatial, temporal, social and topical data that related to each of the plurality of users who entered the questions and answers at the time such questions and answers were entered (that is to say, the context of the users at the time the questions and answers were entered.)

In one embodiment, the knowledge data for each question and answer additionally comprises an identification of at least one of a plurality of users who have consumed the knowledge data (e.g. any users who have viewed the knowledge data.) In one embodiment, the knowledge data additionally comprises spatial, temporal, social and topical data that related to each of the plurality of users who have consumed the knowledge data at the time the data was consumed (e.g., the context of the users viewing the knowledge data at the time the knowledge data was viewed.)

In one embodiment, the knowledge data additionally comprises a selection of a best answer, wherein the user who originally entered the question has selected a best answer from among the answers posted. In one embodiment, the knowledge data for at least some questions and answers additionally comprises consumption popularity data (e.g., the number of times a question or answer was selected or viewed.) In one embodiment, the knowledge data for at least some questions and answers additionally comprises annotations which, in one embodiment, can be entered by any user of the system. In one embodiment, the knowledge data for at least some answers additionally comprises ratings of the answer's usefulness by users, which can be entered by the questioning user or by consuming users.

In one embodiment, the Question Manager 5300 can receive requests for suggested questions from the User Manager 5100, each request comprising at least an identification of a user. In one embodiment, for every request for a suggested question, a query is formulated so as to search, via the network, for knowledge data, user profile data, social network data, spatial data, temporal data and topical data and relates to the identified user so as to identify knowledge data relevant to the user's current context. In one embodiment, the Question Manager 5300 only identifies questions that are responsive to the requests for suggested questions. In one embodiment, the Question Manager 5300 identifies questions and answers that are responsive to the requests for suggested questions. In one embodiment, the identified knowledge data is passed to the User Manager 5100 for transmission back to questioning users 5160.

In one embodiment, if only questions are initially retrieved by the Question Manager 5300, the User Manager 5100 can present the questions to requesting users 5140 for selection and receive selections of suggested questions from the users. The Question Manager 5300 can then use the selected questions to formulate queries so as to search, via the network, for knowledge data, user profile data, social network data, spatial data, temporal data and topical data and relates to selected question criteria and the identified user so as to identify knowledge data relevant to the identified user and the selected questions. In one embodiment, the identified knowledge data is passed to the User Manager 5100 for transmission back to requesting users 5160.

In one embodiment, when a suggested question is selected by a user, the Question Manager 5300 updates the knowledge database 5900 to reflect the fact the question has been selected by the user. In one embodiment, the number of times a question has been selected is stored on the knowledge database. In one embodiment, the context of every user that has selected the question is recorded on the knowledge database. In one embodiment, selection count data can be used to rank the identified knowledge data transmitted to the end user.

In one embodiment, the Question Manager 5300 can rank identified knowledge data is based on the closeness of fit between the modified question criteria and the identified knowledge data. In one embodiment, the Question Manager 5300 can rank identified knowledge data based the closeness of fit between the context of the user entering the original question, and the current or historical context of the users who entered the knowledge data relating to the user's questions. (e.g. the closeness of fit between social network data, spatial data, temporal data and topical data that is available, via the network, that relates to the identified user and the spatial, temporal, social and topical data that related to each of the first plurality of users who entered the identified knowledge data at the time the identified knowledge data was collected.)

In one embodiment, the Question Manager 5300 can rank identified knowledge data based the closeness of fit between the context of the user entering the original question, and the current or historical context of the users who consumed the knowledge data relating to the user's questions. (e.g. the closeness of fit between social network data, spatial data, temporal data and topical data that is available, via the network, that relates to the identified user and the spatial, temporal, social and topical data that related to each of the second plurality of users who consumed the identified knowledge data at the time the knowledge data was consumed.)

In one embodiment, the Question Manager 5300 is configured to add questions to the knowledge databases 5800 when a user enters a question that has not previously been posed. In one embodiment, each question added to the knowledge databases comprises an identification of a user and at least one question criteria, which may include data objects. In one embodiment, for each question added to the knowledge database, the Question Manager 5300 adds spatial, temporal, social and topical data that related the user who entered the question at the time the question was entered (that is to say, the context of the user at the time the question was entered.) In one embodiment, if a question contains a data object, the data object is added to the knowledge database in association with the question. In one embodiment, if the same question is asked by more that one user, the context of every user entering the question is added to the knowledge database in association with the question.

In one embodiment, the Answer Manager 5400 is configured to add answers to the knowledge databases 5800 when a user answers a question using, in one embodiment, a user interface provided by the User Manager 5100. In one embodiment, each answer added to the knowledge databases comprises an identification of a user and answer data, which can include text, and other data objects such as media objects. In one embodiment, for each question added to the knowledge database, the Answer Manager 5400 adds spatial, temporal, social and topical data that related the user who entered the answer at the time the question was entered (that is to say, the context of the user at the time the answer was entered.) In one embodiment, the Answer Manager is further configured to receive selections of best answers, wherein the user who originally entered the question has selected a best answer from among the answers posted.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
   receiving a question, over a network, from a questioning user, the question comprising an identification of a user and at least one question criteria;
   formulating a first query so as to search, via the network, using a global index comprising a global graph that relates entities known to the network with one another, for user profile data, social network data, spatial data, temporal data and topical data that is available via the network and relates to the question criteria and the identified user so as to identify user context data relevant to the at least one question criteria;

modifying the question, via the network, using the user context data to create at least one modified question having at least one additional criteria based on the user context data;

formulating a second query so as to search, via the network, using the global index, for knowledge data, user profile data, social network data, spatial data, temporal data and topical data that is available via the network and relates to the modified question criteria and the identified user so as to identify knowledge data relevant to the identified user and the modified question criteria;

transmitting, over the network, the identified knowledge data to the questioning user.

2. The method of claim 1 wherein the identification of a user is selected from the list: a name, a login, an email address, a user ID on a social networking website, a certified introduction from a trusted source.

3. The method of claim 1 wherein the identification of a user refers to the questioning user.

4. The method of claim 1 wherein the at least one question criteria comprise spatial, temporal, topical and social criteria.

5. The method of claim 1 wherein the at least one question criteria are related to one another using standard relational operators.

6. The method of claim 1 wherein the question is stated as a natural language query.

7. The method of claim 1 wherein the at least one question criteria comprises at least one data object.

8. The method of claim 7 wherein the at least one data object is selected from the list: image file, audio file, media object, document.

9. The method of claim 7 wherein the at least one data object is a media object captured by the questioning user in real-time.

10. The method of claim 7 wherein the data object is processed to extract metadata from the object which is used in formulating the first and second queries.

11. The method of claim 1 wherein the knowledge data comprises questions and answers entered by a first plurality of users.

12. The method of claim 11 wherein the knowledge data for each question and answer additionally comprises an identification of at least one of the first plurality of users who entered the knowledge data.

13. The method of claim 12 wherein the knowledge data for each question and answer additionally comprises spatial, temporal, social and topical data that related to each of the first plurality of users who entered the knowledge data at the time the knowledge data was entered.

14. The method of claim 11 wherein the knowledge data for each question and answer additionally comprises an identification of at least one of a second plurality of users who consumed the knowledge data.

15. The method of claim 14 wherein the knowledge data for each question and answer additionally comprises spatial, temporal, social and topical data that related to each of the second plurality of users who consumed the knowledge data at the time the knowledge data was consumed.

16. The method of claim 11 wherein the knowledge data for at least some questions and answers additionally comprises consumption popularity data.

17. The method of claim 11 wherein the knowledge data for at least some questions and answers additionally comprises annotations.

18. The method of claim 11 wherein the knowledge data for at least some answers additionally comprises ratings of the answer's usefulness.

19. The method of claim 1 wherein the identified knowledge data is ranked based on the closeness of fit between the modified question criteria and the identified knowledge data.

20. The method of claim 13 wherein the identified knowledge data is ranked based on the closeness of fit between social network data, spatial data, temporal data and topical data that is available, via the network, that relates to the identified user and the spatial, temporal, social and topical data that related to each of the first plurality of users who entered the identified knowledge data at the time the identified knowledge data was entered.

21. The method of claim 15 wherein the identified knowledge data is ranked based on the closeness of fit between social network data, spatial data, temporal data and topical data that is available, via the network, that relates to the identified user and the spatial, temporal, social and topical data that related to each of the second plurality of users who consumed the identified knowledge data at the time the knowledge data was consumed.

22. The method of claim 1 wherein the identified knowledge data transmitted to the questioning user is filtered using user preferences.

23. The method of claim 22 wherein the user preferences comprise spatial, temporal, social and topical criteria.

24. A method comprising:

receiving a question, over a network, from a questioning user, the question comprising an identification of a user and at least one question criteria;

formulating a first query so as to search, via the network, using a global index comprising a global graph that relates entities known to the network with one another, for user profile data, social network data, spatial data, temporal data and topical data that is available via the network and relates to the question criteria and the identified user so as to identify user context data relevant to the at least one question criteria;

modifying the question, via the network, using the user context data to create at least one modified question having at least one additional criteria based on the user context data;

transmitting, over the network, the at least one modified question to the questioning user;

receiving, over the network, from the questioning user, a selection of at least one of the at least one modified questions;

formulating a second query so as to search, via the network, using the global index, for knowledge data, user profile data, social network data, spatial data, temporal data and topical data that is available via the network and relates to the criteria of the selected at least one modified questions and the identified user so as to identify knowledge data relevant to the identified user and the criteria of the selected at least one modified questions;

transmitting, over the network, the identified knowledge data to the questioning user.

25. A method comprising:

receiving a request for at least one suggested question, over a network, from a requesting user, the question comprising an identification of a user;

formulating a first query so as to search, via the network, using a global index comprising a global graph that relates entities known to the network with one another, for knowledge data, user profile data, social network data, spatial data, temporal data and topical data available to the network that relates to the identified user so as to identify knowledge data relevant to the identified user's current context;

transmitting, over the network, the identified knowledge data to the requesting user.

26. The method of claim 25 wherein the identification of a user is selected from the list: a name, a login, an email address, a user ID on a social networking website, a certified introduction from a trusted source.

27. The method of claim 25 wherein the identification of a user refers to the requesting user.

28. The method of claim 25 wherein the request is submitted in response to a user initiated event on the requesting user's proxy device.

29. The method of claim 25 wherein the request is automatically submitted on behalf of the requesting user in response to a trigger event.

30. The method of claim 29 wherein the trigger event is the expiration of a time interval.

31. The method of claim 29 wherein the trigger event is a change in the requesting user's current context data.

32. The method of claim 31 wherein the change in the requesting user's current context data is a change in the requesting user's current physical location.

33. The method of claim 31 wherein the change in the requesting user's current context data is a change in the state of a sensor associated with the requesting user.

34. The method of claim 25 wherein the knowledge data comprises questions and answers entered by a first plurality of users.

35. The method of claim 34 wherein the knowledge data for each question and answer additionally comprises an identification of at least one of the first plurality of users who entered the knowledge data.

36. The method of claim 35 wherein the knowledge data for each question and answer additionally comprises spatial, temporal, social and topical data that related to each of the first plurality of users who entered the knowledge data at the time such knowledge data was entered.

37. The method of claim 34 wherein the knowledge data for each question and answer additionally comprises an identification of at least one of a second plurality of users who consumed the knowledge data.

38. The method of claim 37 wherein the knowledge data for each question and answer additionally comprises spatial, temporal, social and topical data that related to each of the second plurality of users who consumed the knowledge data at the time the knowledge data was consumed.

39. The method of claim 34 wherein the knowledge data for at least some questions and answers additionally comprises consumption popularity data.

40. The method of claim 34 wherein the knowledge data for at least some questions and answers additionally comprises annotations.

41. The method of claim 34 wherein the knowledge data for at least some answers additionally comprises ratings of the answer's usefulness.

42. The method of claim 25 wherein the identified knowledge data is ranked based on the closeness of fit between the modified question criteria and the identified knowledge data.

43. The method of claim 36 wherein the identified knowledge data is ranked based on the closeness of fit between social network data, spatial data, temporal data and topical data that is available, via the network, that relates to the identified user and the spatial, temporal, social and topical data that related to each of the first plurality of users who entered the identified knowledge data at the time the identified knowledge data was entered.

44. The method of claim 38 wherein the identified knowledge data is ranked based on the closeness of fit between social network data, spatial data, temporal data and topical data that is available, via the network, that relates to the identified user and the spatial, temporal, social and topical data that related to each of the second plurality of users who consumed the identified knowledge data at the time the knowledge data was entered.

45. The method of claim 25 wherein the identified knowledge data transmitted to the questioning user is filtered using user preferences.

46. The method of claim 45 wherein the user preferences comprise spatial, temporal, social and topical criteria.

47. A method comprising:

receiving a request for at least one suggested question, over a network, from a requesting user, the question comprising an identification of a user;

formulating a first query so as to search, via the network, using a global index comprising a global graph that relates entities known to the network with one another, for knowledge data, user profile data, social network data, spatial data, temporal data and topical data available to the network that relates to the identified user so as to identify at least one question relevant to the identified user's current context;

transmitting, over the network, the identified at least one question to the requesting user;

receiving, over a network, from the requesting user, a selection of at least one of the identified at least one questions;

formulating a second query so as to search, via the network, using the global index, for knowledge data, user profile data, social network data, spatial data, temporal data and topical data that is available via the network and relates to the criteria of the selected at least one question and the identified user so as to identify knowledge data relevant to the identified user and the criteria of the selected at least one questions;

transmitting, over the network, the identified knowledge data to the requesting user.

48. The method of claim 32 comprising the additional step of updating the knowledge data relating to the selected at least one questions to reflect that the selected at least one questions was selected by the requesting user.

49. The method of claim 33 wherein the knowledge data relating to the selected at least one questions is updated to reflect the number of times the question has been selected.

50. The method of claim 33 wherein the knowledge data relating to the selected at least one questions is updated to include the context data for substantially all users that have selected the question.

51. A system comprising:

a processor;

a storage medium for tangibly storing thereon program logic for execution by the processor, the program logic comprising:

user manager logic executed by the processor for receiving questions, over a network, from questioning users, each question comprising an identification of a user and at least one question criteria query analyzer manager logic executed by the processor for, for each question received by the user manager, formulating a query so as to search, via the network, using a global index comprising a global graph that relates entities known to the network with one another, for user profile data, social network data, spatial data, temporal data and topical data that is available via the network and relates to the question criteria and the identified user so as to identify user context data relevant to question criteria, wherein the query analyzer manager modifies the question, using the user context data to create at least one modified question having at least one additional criteria based on the user context data;

question manager logic executed by the processor for, for each modified question, formulating a query so as to search, via the network, using the global index, for knowledge data, user profile data, social network data, spatial data, temporal data and topical data that is available via the network and relates to the modified question criteria and the identified user so as to identify knowledge data relevant to the identified user and the modified question criteria, wherein the identified knowledge data is transmitted by the user manager, via the network, to the questioning user.

52. The system of claim 51 wherein, for at least some questions, the at least one question criteria comprises at least one data object.

53. The system of claim 51 wherein the knowledge data comprises questions and answers entered by a first plurality of users.

54. The system of claim 53 wherein the knowledge data for each question and answer additionally comprises spatial, temporal, social and topical data that related to each of the first plurality of users who entered the knowledge data at the time such knowledge data was entered.

55. The system of claim 53 wherein the knowledge data for each question and answer additionally comprises spatial, temporal, social and topical data that related to each of a second plurality of users who consumed the knowledge data at the time the knowledge data was consumed.

56. The system of claim 53 wherein for each modified question processed by the question manager, the identified knowledge data is ranked by the question manager based on the closeness of fit between the modified question criteria and the identified knowledge data.

57. The system of claim 53 wherein for each modified question processed by the question manager logic, the identified knowledge data is ranked by the question manager based on the closeness of fit between social network data, spatial data, temporal data and topical data that is available, via the network, that relates to the identified user and the spatial, temporal, social and topical data that related to each of the first plurality of users who entered the identified knowledge data at the time the identified knowledge data was entered.

58. The system of claim 53 wherein for each modified question processed by the question manager logic, the identified knowledge data is ranked by the question manager based on the closeness of fit between social network data, spatial data, temporal data and topical data that is available, via the network, that relates to the identified user and the spatial, temporal, social and topical data that related to each of the second plurality of users who consumed the identified knowledge data at the time the knowledge data was consumed.

59. The system of claim 51 wherein
the user manager is further configured to transmit, over the network, modified questions to questioning users so as to allow the questioning users to select modified questions to be processed by the question manager, wherein the user manager is further configured to receive selections of modified questions from questioning users, and the question manager is further configured to only process modified questions that have been selected by questioning users.

60. A system comprising:
a processor;
a storage medium for tangibly storing thereon program logic for execution by the processor, the program logic comprising:
user manager logic executed by the processor for receiving requests for at least one suggested question, over a network, from requesting users, the request comprising an identification of a user;
question manager logic executed by the processor for, for each request received by the user manager, formulates queries so as to search, via the network, using a global index comprising a global graph that relates entities known to the network with one another, for knowledge data, user profile data, social network data, spatial data, temporal data and topical data available to the network that relates to the identified user so as to identify knowledge data relevant to the identified user's current context, wherein the user manager transmits, over the network, the identified knowledge data to the requesting user.

61. The system of claim 60 wherein at least some requests are transmitted to the user manager in response to a user initiated event on the requesting user's proxy device.

62. The system of claim 60 wherein at least some requests are automatically generated by the user manager in response to a trigger event.

63. The system of claim 62 wherein the trigger event is the expiration of a time interval.

64. The system of claim 62 wherein the trigger event is a change in the requesting user's current context data.

65. The system of claim 60 wherein the knowledge data comprises questions and answers entered by a first plurality of users.

66. The system of claim 65 wherein the knowledge data for each question and answer additionally comprises spatial, temporal, social and topical data that related to each of the first plurality of users who entered the knowledge data at the time such knowledge data was entered.

67. The system of claim 65 wherein the knowledge data for each question and answer additionally comprises spatial, temporal, social and topical data that related to each of a second plurality of users who consumed the knowledge data at the time the knowledge data was consumed.

68. The system of claim 60 wherein for each modified question processed by the question manager, the identified knowledge data is ranked by the question manager based on the closeness of fit between the modified question criteria and the identified knowledge data.

69. The system of claim 66 wherein for each modified question processed by the question manager logic, the identified knowledge data is ranked by the question manager based on the closeness of fit between social network data, spatial data, temporal data and topical data that is available, via the network, that relates to the identified user and the spatial, temporal, social and topical data that related to each of the first plurality of users who entered the identified knowledge data at the time the identified knowledge data was entered.

70. The system of claim 67 wherein for each modified question processed by the question manager logic, the identified knowledge data is ranked by the question manager based on the closeness of fit between social network data, spatial data, temporal data and topical data that is available, via the network, that relates to the identified user and the spatial, temporal, social and topical data that related to each of the second plurality of users who consumed the identified knowledge data at the time the knowledge data was consumed.

71. A non-transitory computer-readable storage medium for tangibly storing thereon computer readable instructions for a method comprising:
  receiving a question, over a network, from a questioning user, the question comprising an identification of a user and at least one question criteria;
  formulating a first query so as to search, via the network, using a global index comprising a global graph that relates entities known to the network with one another, for user profile data, social network data, spatial data, temporal data and topical data that is available via the network and relates to the question criteria and the identified user so as to identify user context data relevant to the at least one question criteria;
  modifying the question, via the network, using the user context data to create at least one modified question having at least one additional criteria based on the user context data;
  formulating a second query so as to search, via the network, using the global index, for knowledge data, user profile data, social network data, spatial data, temporal data and topical data that is available via the network and relates to the modified question criteria and the identified user so as to identify knowledge data relevant to the identified user and the modified question criteria;
  transmitting, over the network, the identified knowledge data to the questioning user.

72. The non-transitory computer-readable storage medium of claim 71 wherein the at least one question criteria comprises at least one data object.

73. The non-transitory computer-readable storage medium of claim 71 wherein the knowledge data comprises questions and answers entered by a first plurality of users.

74. The non-transitory computer-readable storage medium of claim 73 wherein the knowledge data for each question and answer additionally comprises spatial, temporal, social and topical data that related to each of the first plurality of users who entered the knowledge data at the time the knowledge data was entered.

75. The non-transitory computer-readable storage medium of claim 73 wherein the knowledge data for each question and answer additionally comprises spatial, temporal, social and topical data that related to each of the second plurality of users who consumed the knowledge data at the time the knowledge data was consumed.

76. The non-transitory computer-readable storage medium of claim 71 wherein the identified knowledge data is ranked based on the closeness of fit between the modified question criteria and the identified knowledge data.

77. The non-transitory computer-readable storage medium of claim 74 wherein the identified knowledge data is ranked based on the closeness of fit between social network data, spatial data, temporal data and topical data that is available, via the network, that relates to the identified user and the spatial, temporal, social and topical data that related to each of the first plurality of users who entered the identified knowledge data at the time the identified knowledge data was entered.

78. The non-transitory computer-readable storage medium of claim 75 wherein the identified knowledge data is ranked based on the closeness of fit between social network data, spatial data, temporal data and topical data that is available, via the network, that relates to the identified user and the spatial, temporal, social and topical data that related to each of the second plurality of users who consumed the identified knowledge data at the time the knowledge data was consumed.

79. A non-transitory computer-readable storage medium for tangibly storing thereon computer readable instructions for a method comprising:
  receiving a request for at least one suggested question, over a network, from a requesting user, the question comprising an identification of a user;
  formulating a first query so as to search, via the network, using a global index comprising a global graph that relates entities known to the network with one another, for knowledge data, user profile data, social network data, spatial data, temporal data and topical data available to the network that relates to the identified user so as to identify knowledge data relevant to the identified user's current context;
  transmitting, over the network, the identified knowledge data to the requesting user.

80. The non-transitory computer-readable storage medium of claim 79 wherein the request is submitted in response to a user initiated event on the requesting user's proxy device.

81. The non-transitory computer-readable storage medium of claim 79 wherein the request is automatically submitted on behalf of the requesting user in response to a trigger event.

82. The non-transitory computer-readable storage medium of claim 81 wherein the trigger event is the expiration of a time interval.

83. The non-transitory computer-readable storage medium of claim 81 wherein the trigger event is a change in the requesting user's current context data.

84. The non-transitory computer-readable storage medium of claim 79 wherein the knowledge data comprises questions and answers entered by a first plurality of users.

85. The non-transitory computer-readable storage medium of claim 84 wherein the knowledge data for each question and answer additionally comprises spatial, temporal, social and topical data that related to each of the first plurality of users who entered the knowledge data at the time such knowledge data was entered.

86. The non-transitory computer-readable storage medium of claim 84 wherein the knowledge data for each question and answer additionally comprises spatial, temporal, social and topical data that related to each of the second plurality of users who consumed the knowledge data at the time the knowledge data was consumed.

87. The non-transitory computer-readable storage medium of claim 79 wherein the identified knowledge data is ranked based on the closeness of fit between the modified question criteria and the identified knowledge data.

88. The non-transitory computer-readable storage medium of claim 85 wherein the identified knowledge data is ranked based on the closeness of fit between social network data, spatial data, temporal data and topical data thai is available, via the network, that relates to the identified user and the spatial, temporal, social and topical data that related to each of the first plurality of users who entered the identified knowledge data at the time the identified knowledge data was entered 89. The non-transitory computer-readable storage medium of claim 86 wherein the identified knowledge data is ranked based on the closeness of fit between social network data, spatial data, temporal data and topical data that is available, via the network, that relates to the identified user and the spatial, temporal, social and topical data that related to each of the second plurality of users who consumed the identified knowledge data at the time the knowledge data was consumed.

* * * * *